(12) United States Patent
Mogou Dessap et al.

(10) Patent No.: US 11,578,568 B2
(45) Date of Patent: Feb. 14, 2023

(54) WELL MANAGEMENT ON CLOUD COMPUTING SYSTEM

(71) Applicant: SCHLUMBERGER TECHNOLOGY CORPORATION, Sugar Land, TX (US)

(72) Inventors: Jean-Paul Mogou Dessap, Houston, TX (US); Piyush Pankaj, Sugar Land, TX (US); Kenneth J. Sheldon, Houston, TX (US); Hitoshi Onda, Houston, TX (US); Bjorn Nordmoen, Asker (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 252 days.

(21) Appl. No.: 15/751,013

(22) PCT Filed: Mar. 7, 2016

(86) PCT No.: PCT/US2016/021159
§ 371 (c)(1),
(2) Date: Feb. 7, 2018

(87) PCT Pub. No.: WO2017/027068
PCT Pub. Date: Feb. 16, 2017

(65) Prior Publication Data
US 2018/0230785 A1    Aug. 16, 2018

Related U.S. Application Data

(60) Provisional application No. 62/202,465, filed on Aug. 7, 2015.

(51) Int. Cl.
*E21B 41/00*    (2006.01)
*G06Q 10/06*    (2012.01)
(Continued)

(52) U.S. Cl.
CPC .......... *E21B 41/0092* (2013.01); *E21B 41/00* (2013.01); *E21B 43/26* (2013.01);
(Continued)

(58) Field of Classification Search
None
See application file for complete search history.

(56) References Cited

U.S. PATENT DOCUMENTS 6,101,447 A     8/2000   Poe, Jr.
7,085,696 B2 *  8/2006   King ...................... E21B 12/02
                                                      703/10
(Continued)

FOREIGN PATENT DOCUMENTS

WO    2013016733 A1    1/2013
WO    2013055930 A1    4/2013
(Continued)

OTHER PUBLICATIONS

Yanfang et al., Refracture candidate selection using hybrid simulation with neural network and data analysis techniques, Journal of Petroleum Science and Engineering, vol. 123, 2014, pp. 138-146 (Year: 2014).*

(Continued)

*Primary Examiner* — Darlene Garcia-Guerra

(57) ABSTRACT

Well management includes receiving, from a user computing system, a simulation job request for simulating well management on the cloud computing system including compute nodes, and obtaining, for the simulation job request, search spaces for completion stage simulations, fracture stage simulations, and production stage simulations. Well management further includes orchestrating, using the search spaces, the completion stage simulations, the fracture stage simulations, and the production stage simulations on the cloud computing system to obtain at least one optional well (Continued)

plan, and sending the at least one optional well plan to the user computer system.

18 Claims, 15 Drawing Sheets

(51) Int. Cl.
| | |
|---|---|
| *E21B 43/26* | (2006.01) |
| *G06Q 50/02* | (2012.01) |
| *G06Q 10/067* | (2023.01) |
| *G16Y 10/20* | (2020.01) |
| *E21B 34/06* | (2006.01) |
| *E21B 43/14* | (2006.01) |
| *E21B 49/00* | (2006.01) |
| *E21B 49/08* | (2006.01) |

(52) U.S. Cl.
CPC ........... *G06Q 10/06* (2013.01); *G06Q 10/067* (2013.01); *G06Q 50/02* (2013.01); *E21B 34/06* (2013.01); *E21B 43/14* (2013.01); *E21B 49/00* (2013.01); *E21B 49/08* (2013.01); *G16Y 10/20* (2020.01)

(56) References Cited

U.S. PATENT DOCUMENTS

| | | | |
|---|---|---|---|
| 7,363,162 B2 | 4/2008 | Thambynayagam et al. | |
| 7,509,245 B2 | 3/2009 | Siebrits et al. | |
| 7,716,029 B2 | 5/2010 | Couet et al. | |
| 7,784,544 B2 | 8/2010 | Lindvig et al. | |
| 7,788,074 B2 | 8/2010 | Scheldt et al. | |
| 8,271,243 B2 | 9/2012 | Koutsabeloulis et al. | |
| 8,280,709 B2 | 10/2012 | Koutsabeloulis et al. | |
| 8,412,500 B2 | 4/2013 | Weng et al. | |
| 8,428,923 B2 | 4/2013 | Siebrits et al. | |
| 8,571,843 B2 | 10/2013 | Weng et al. | |
| 9,228,425 B2 | 1/2016 | Ganguly et al. | |
| 9,715,026 B2 | 7/2017 | Ejofodomi et al. | |
| 2004/0008580 A1 | 1/2004 | Fisher et al. | |
| 2004/0220846 A1* | 11/2004 | Cullick | G06Q 10/06 705/7.22 |
| 2007/0156377 A1* | 7/2007 | Gurpinar | G06Q 10/06 703/10 |
| 2007/0294034 A1* | 12/2007 | Bratton | E21B 41/00 702/6 |
| 2008/0091396 A1* | 4/2008 | Kennon | E21B 43/26 703/10 |
| 2008/0133186 A1 | 6/2008 | Li et al. | |
| 2008/0183451 A1 | 7/2008 | Weng et al. | |
| 2009/0084545 A1* | 4/2009 | Banerjee | E21B 43/00 166/250.15 |
| 2009/0095469 A1* | 4/2009 | Dozier | E21B 43/26 166/250.01 |
| 2010/0076738 A1 | 3/2010 | Dean et al. | |
| 2010/0088076 A1 | 4/2010 | Koutsabeloulis et al. | |
| 2010/0138196 A1* | 6/2010 | Hui | E21B 43/00 703/1 |
| 2010/0250215 A1 | 9/2010 | Kennon et al. | |
| 2010/0332442 A1* | 12/2010 | Goel | G06N 7/02 706/52 |
| 2011/0022363 A1* | 1/2011 | Furman | G06F 30/20 703/1 |
| 2011/0029291 A1 | 2/2011 | Weng et al. | |
| 2011/0040536 A1* | 2/2011 | Levitan | G06F 30/20 703/2 |
| 2011/0120706 A1 | 5/2011 | Craig | |
| 2011/0125471 A1 | 5/2011 | Craig et al. | |
| 2011/0257944 A1 | 10/2011 | Du et al. | |
| 2011/0264430 A1* | 10/2011 | Tapscott | G01V 99/00 703/10 |
| 2012/0060165 A1* | 3/2012 | Clarke | G06F 11/3051 718/104 |
| 2012/0179444 A1* | 7/2012 | Ganguly | E21B 43/26 703/10 |
| 2012/0232859 A1* | 9/2012 | Pomerantz | G06F 17/5009 703/2 |
| 2012/0232872 A1 | 9/2012 | Nasreldin et al. | |
| 2013/0006597 A1 | 1/2013 | Craig | |
| 2013/0018642 A1* | 1/2013 | Mifflin | G05B 17/02 703/10 |
| 2013/0140031 A1* | 6/2013 | Cohen | E21B 43/26 166/308.1 |
| 2013/0144532 A1 | 6/2013 | Williams et al. | |
| 2013/0215712 A1 | 8/2013 | Geiser et al. | |
| 2013/0231781 A1 | 9/2013 | Chapman | |
| 2013/0238303 A1* | 9/2013 | Round | G06F 30/20 703/6 |
| 2013/0238304 A1 | 9/2013 | Glinsky | |
| 2013/0304444 A1* | 11/2013 | Strobel | E21B 43/26 703/10 |
| 2014/0052377 A1 | 2/2014 | Downie | |
| 2014/0067353 A1* | 3/2014 | Shelley | E21B 43/26 703/10 |
| 2014/0076543 A1 | 3/2014 | Ejofodomi et al. | |
| 2014/0116776 A1* | 5/2014 | Marx | E21B 44/00 175/24 |
| 2014/0149098 A1 | 5/2014 | Bowen et al. | |
| 2014/0151033 A1 | 6/2014 | Xu | |
| 2014/0151035 A1 | 6/2014 | Cohen et al. | |
| 2014/0188892 A1* | 7/2014 | Ludvigsen | G06Q 50/01 707/741 |
| 2014/0222405 A1* | 8/2014 | Lecerf | E21B 43/26 703/10 |
| 2014/0299315 A1 | 10/2014 | Chuprakov et al. | |
| 2014/0305638 A1 | 10/2014 | Kresse et al. | |
| 2014/0372089 A1 | 12/2014 | Weng et al. | |
| 2014/0379317 A1 | 12/2014 | Sanden et al. | |
| 2015/0066462 A1* | 3/2015 | Shetty | G01V 99/005 703/10 |
| 2015/0120255 A1 | 4/2015 | King et al. | |
| 2015/0151035 A1 | 6/2015 | Huemer | |
| 2015/0186570 A1 | 7/2015 | Huang et al. | |
| 2015/0204174 A1 | 7/2015 | Kresse et al. | |
| 2015/0212224 A1* | 7/2015 | Williams | G01V 1/288 702/14 |
| 2016/0109954 A1* | 4/2016 | Harris | G06K 9/00671 345/156 |
| 2016/0266278 A1* | 9/2016 | Holderby | G01V 1/288 |
| 2016/0357883 A1 | 12/2016 | Weng et al. | |
| 2016/0357887 A1* | 12/2016 | Ortiz | E21B 41/00 |
| 2017/0075004 A1* | 3/2017 | Mccolpin | G01V 1/306 |
| 2017/0205531 A1* | 7/2017 | Berard | E21B 7/04 |
| 2018/0119534 A1* | 5/2018 | Jamison | G05B 17/00 |

FOREIGN PATENT DOCUMENTS

| | | |
|---|---|---|
| WO | 2013067363 A1 | 5/2013 |
| WO | 2014105659 A1 | 7/2014 |
| WO | 2015003028 A1 | 1/2015 |
| WO | 2015069817 A1 | 5/2015 |
| WO | 2017007745 A1 | 1/2017 |
| WO | 2017027340 A1 | 2/2017 |
| WO | 2017027342 A1 | 2/2017 |
| WO | 2017027433 A1 | 2/2017 |

OTHER PUBLICATIONS

Ding, Didier Yu, Y. S. Wu, and L. Jeannin. "Efficient simulation of hydraulic fractured wells in unconventional reservoirs." Journal of Petroleum Science and Engineering 122 (2014): 631-642. (Year: 2014).*

Gerogiorgis, Dimitrios I., et al. "Dynamic oil and gas production optimization via explicit reservoir simulation." Computer Aided Chemical Engineering. vol. 21. Elsevier, 2006. 179-184 (Year: 2006).*

(56) References Cited

OTHER PUBLICATIONS

Gu et al., "Hydraulic Fracture Crossing Natural Fracture at Non-Orthogonal Angles, A criterion, Its Validation and Applications", SPE 139984 presented at the SPE Hydraulic Fracturing Conference and Exhibition, The Woodlands, Texas, Jan. 24-26, 2011, 11 pages.

Kresse et al., "Numerical Modeling of Hydraulic Fracturing in Naturally Fractured Formations", 45th US Rock Mechanics/Geomechanics Symposium, San Francisco, CA, Jun. 26-29, 2011.

International Search Report and Written Opinion issued in International Patent Appl. No. PCT/US2016/045940 dated Nov. 11, 2016; 9 pages.

Suarez-Rivera, R., Behrmann, L., Green, S., Burghardt, J., Stanchits, S., Edelman, E., and Surdi, A., 2013. Defining Three Regions of Hydraulic Fracture Connectivity, in Unconventional Reservoir, Help Designing Completions with Improved Long-Term Productivity. Paper SPE 166505, presented at SPE ATCE, New Orleans, LA, Sep. 30-Oct. 2, 14 pages.

Warpinski, N.R., and Teufel, L.W., 1987. Influence of Geologic Discontinuities on Hydraulic Fracture Propagation (includes associated papers 17011 and 17074). SPE Journal of Petroleum Technology 39(2): 209-220.

Chuprakov, D. and Prioul, R., 2015. Hydraulic Fracture Height Containment by Weak Horizontal Interfaces. Paper SPE 173337 presented at HFTC, Woodlands, TX, Feb. 3-5, 17 pages.

Cipolla, C.L., Warpinski, N.R., Mayerhofer, M.J., Lolon, E.P., and Vincent, M.C., 2010. The Relationship Between Fracture Complexity, Reservoir Properties, and Fracture-Treatment Design, Paper SPE 115769 presented at SPE ATCE, Denver, CO, Sep. 21-24, 25 pages.

International Search Report and Written Opinion issued in International Patent Appl. No. PCT/US2016/045688 dated Nov. 22, 2016; 13 pages.

Weng et al., "Modeling of Hydraulic Fracture Propagation in a Naturally Fractured Formation", Paper SPE 140253 presented at the SPE Hydraulic Fracturing Conference and Exhibition, The Woodlands, Texas, USA, Jan. 24-26, 2011, 18 pages.

International Search Report and Written Opinion issued in International Patent Application No. PCT/US2016/045682 dated Nov. 22, 2016; 11 pages.

International Search Report and Written Opinion issued in International Patent Appl. No PCT/US2016/021159 dated Jun. 23, 2016; 10 pages.

\* cited by examiner

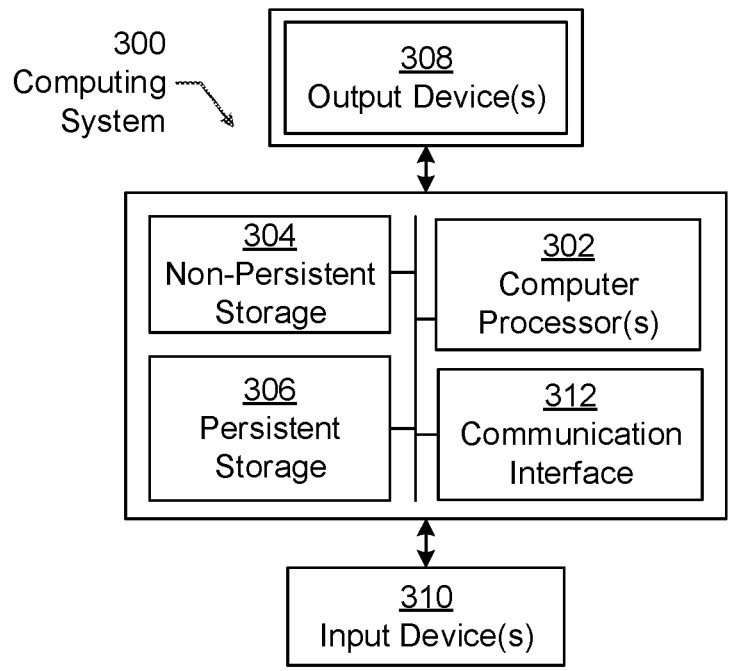
FIG. 3.1
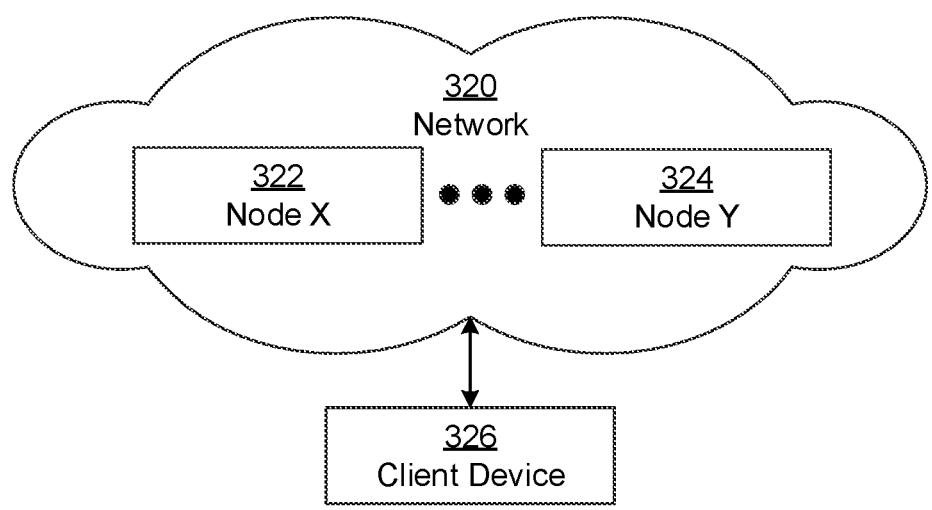
FIG. 3.2

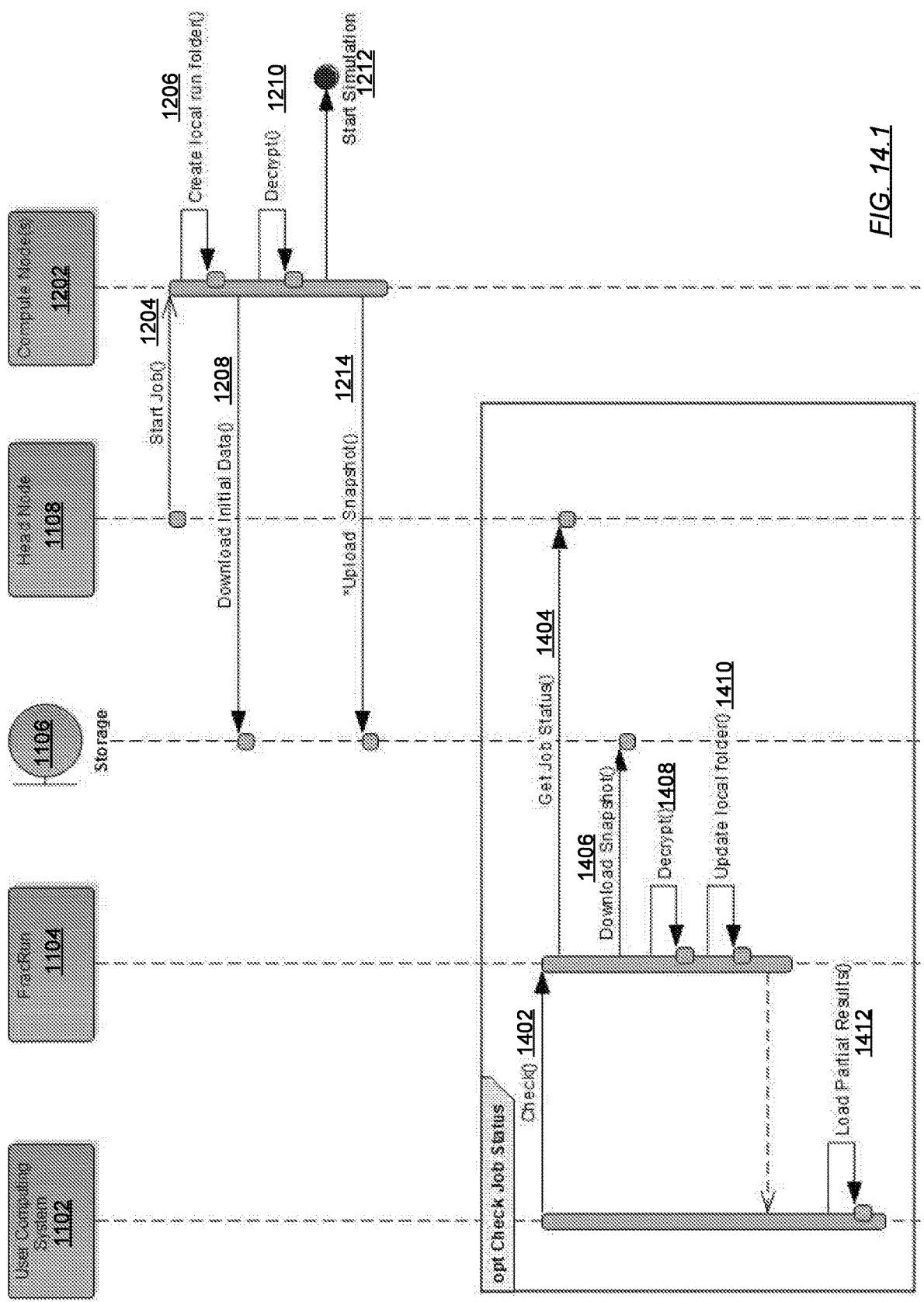
FIG. 14.1

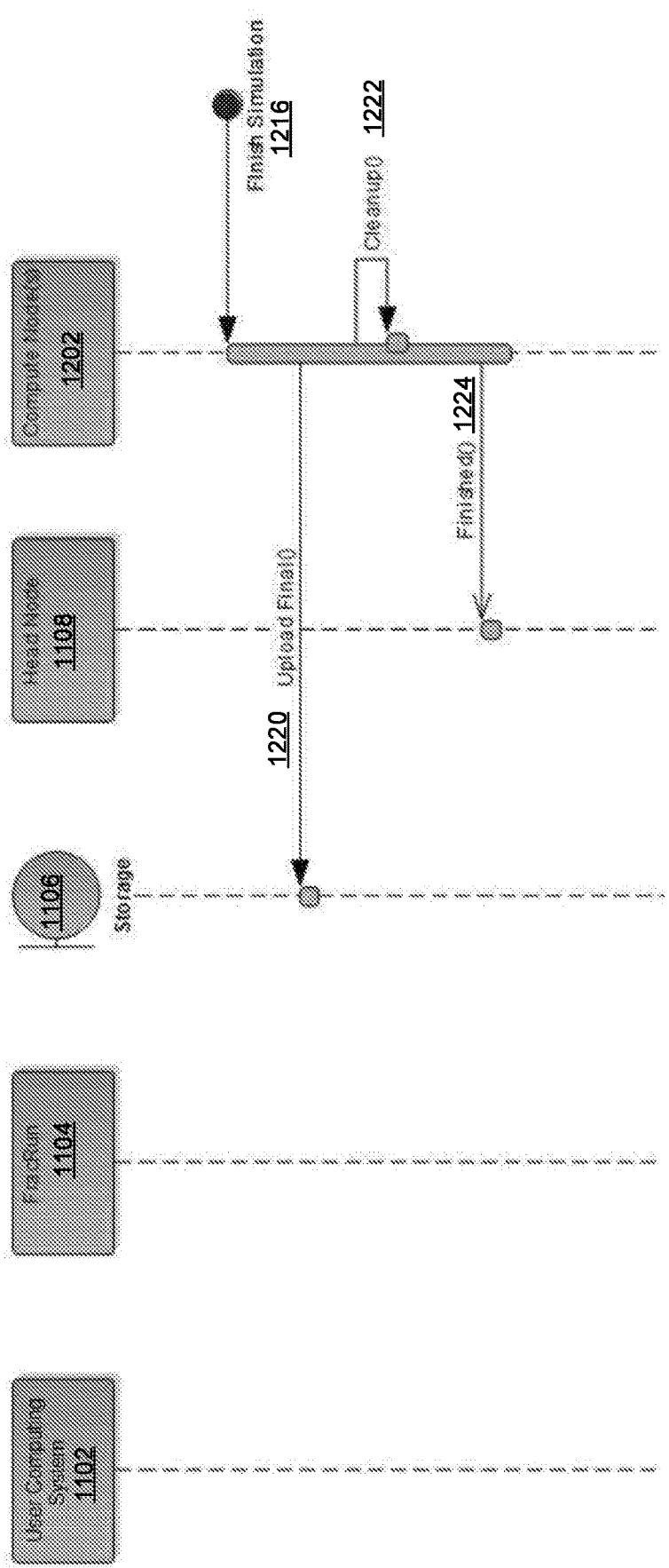
FIG. 14.2

WELL MANAGEMENT ON CLOUD COMPUTING SYSTEM

CROSS-REFERENCE TO RELATED APPLICATIONS

This application claims benefit under 35 U.S.C. § 119(e) of U.S. Provisional Patent Application No. 62/202,465, filed on Aug. 7, 2015, and entitled "METHOD AND SYSTEM FOR SEAMLESS, REAL-TIME AND SCALABLE INTEGRATED WORKFLOW OF WELL COMPLETION DESIGN, HYDRAULIC FRACTURE SIMULATION AND RESERVOIR SIMULATION ON HIGH PERFORMANCE CLOUD COMPUTING," which is hereby incorporated by reference.

BACKGROUND

Operations, such as geophysical surveying, drilling, logging, well completion, and production, are performed to locate and gather valuable downhole fluids from subterranean formations. Well management is the process of determining and setting various parameters of physical equipment for the purposes of optimizing hydrocarbon extraction from a well.

SUMMARY

In general, in one aspect, one or more embodiments relate to well management on a cloud computing system. The well management includes receiving, from a user computing system, a simulation job request for simulating well management on the cloud computing system including compute nodes, and obtaining, for the simulation job request, search spaces for completion stage simulations, fracture stage simulations, and production stage simulations. Well management further includes orchestrating, using the search spaces, the completion stage simulations, the fracture stage simulations, and the production stage simulations on the cloud computing system to obtain at least one optional well plan, and sending the at least one optional well plan to the user computer system.

Other aspects will be apparent from the following description and the appended claims.

BRIEF DESCRIPTION OF DRAWINGS

FIGS. 1, 2, 3.1, 3.2, and 4 show diagrams of systems in accordance with one or more embodiments.

FIGS. 10, 11, 12, 13, 14.1 and 14.2 show examples in accordance with one or more embodiments.

DETAILED DESCRIPTION

Figure 1:
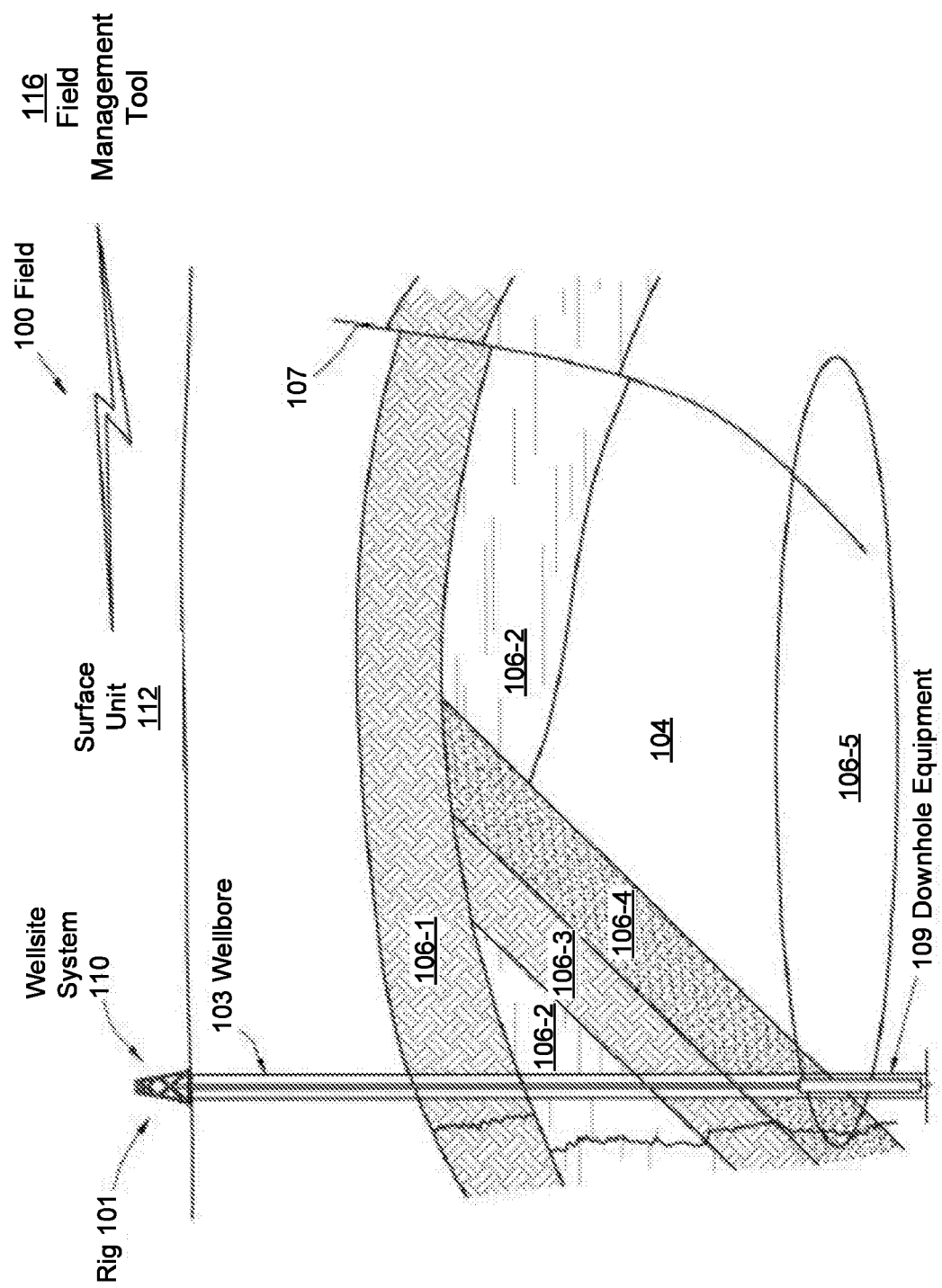

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to well management using a cloud computing system. In particular, one or more embodiments are directed to extracting hydrocarbons from a well optimally by selecting an optimal strategy for completion, fracture generation, and production. In one or more embodiments, to select the optimal strategy, one or more embodiments distribute simulations for the completion, fracture generation, and production to multiple compute nodes in a cloud computing system. By distributing the simulations to a cloud, several magnitudes greater number of simulations may be performed, thereby creating a more robust and optimal solution.

Figure 2:
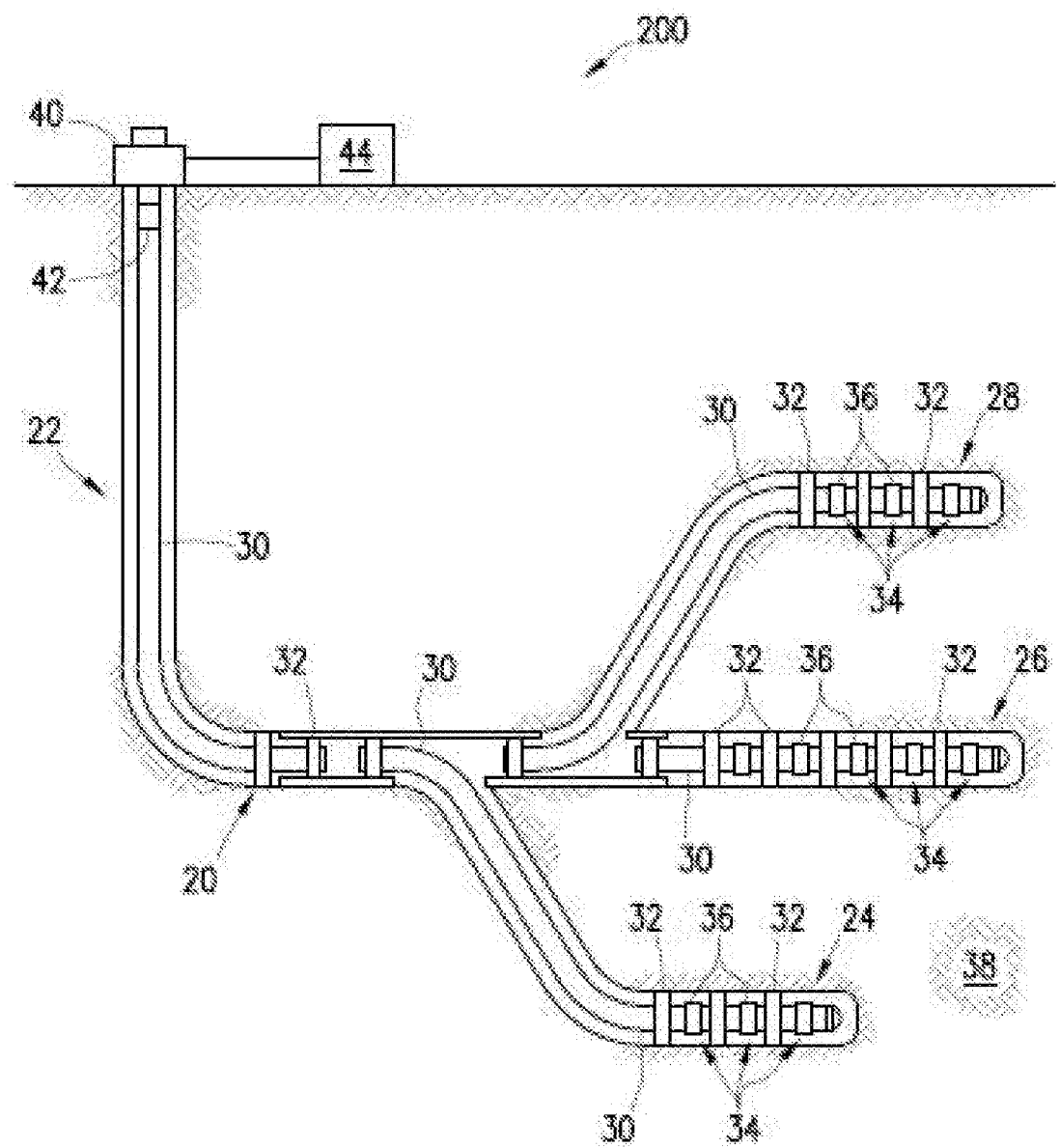

FIGS. 1, 2, 3.1, 3.2, and 4 show diagrams of systems in accordance with one or more embodiments. In particular, FIG. 1 depicts a schematic view, partially in cross section, of a field (100) in which one or more embodiments may be implemented. In one or more embodiments, the field may be an oilfield. In other embodiments, the field may be a different type of field. In one or more embodiments, one or more of the modules and elements shown in FIG. 1 may be omitted, repeated, and/or substituted. Accordingly, embodiments should not be considered limited to the specific arrangements of modules shown in FIG. 1.

A subterranean formation (104) is in an underground geological region. An underground geological region is a geographic area that exists below land or ocean. In one or more embodiments, the underground geological region includes the subsurface formation in which a borehole is or may be drilled and any subsurface region that may affect the drilling of the borehole, such as because of stresses and strains existing in the subsurface region. In other words, the underground geological region may not just include the area immediately surrounding a borehole or where a borehole may be drilled, but also any area that affects or may affect the borehole or where the borehole may be drilled.

As shown in FIG. 1, the subterranean formation (104) may include several geological structures (106-1 through 106-4) of which FIG. 1 provides an example. As shown, the formation may include a sandstone layer (106-1), a limestone layer (106-2), a shale layer (106-3), and a sand layer (106-4). A fault line (107) may extend through the formation. In one or more embodiments, various survey tools and/or data acquisition tools are adapted to measure the formation and detect the characteristics of the geological structures of the formation. The characteristics may include composition, porosity, permeability, lithology, location, resistivity, temperature, angles of faults, fluid saturation distribution, young's modulus, locations, lengths and azimuths of natural fractures, and other properties related to the physical or chemical aspects of the subsurface formation.

Further, as shown in FIG. 1, the wellsite system (110) is associated with a rig (101), a wellbore (103), and other field equipment and is configured to perform wellbore operations, such as logging, drilling, fracturing, production, or other applicable operations. The wellbore (103) may also be referred to as a borehole.

In one or more embodiments, the surface unit (112) is operatively coupled to a field management tool (116) and/or the wellsite system (110). In particular, the surface unit (112) is configured to communicate with the field management tool (116) and/or the wellsite system (110) to send commands to the field management tool (116) and/or the wellsite system (110) and to receive data therefrom. For example, the wellsite system (110) may be adapted for measuring downhole properties using logging-while-drilling ("LWD") tools to obtain well logs and for obtaining core samples. In one or more embodiments, the surface unit (112) may be located at the wellsite system (110) and/or remote locations. The surface unit (112) may be provided with computer facilities for receiving, storing, processing, and/or analyzing data from the field management tool (116), the wellsite system (110), or other part of the field (100). The surface unit (112) may also be provided with or functionally for actuating mechanisms at the field (100). The surface unit (112) may then send command signals to the field (100) in response to data received, for example, to control and/or optimize various field operations described above.

During the various oilfield operations at the field, oilfield data is collected for analysis and/or monitoring of the oilfield operations. Such data may include, for example, subterranean formation, equipment, historical and/or other data. Static data relates to, for example, formation structure and geological stratigraphy that define the geological structures of the subterranean formation. Static data may also include data about the wellbore, such as inside diameters, outside diameters, and depths. Dynamic data relates to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected from the wellbore and the oilfield may be used to create and update a three dimensional model of the subsurface formations. Additionally, static and dynamic data from other wellbores or oilfields may be used to create and update the three dimensional model. Hardware sensors, core sampling, and well logging techniques may be used to collect the data. Other static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once the well is formed and completed, fluid flows to the surface using production tubing and other completion equipment. As fluid passes to the surface, various dynamic measurements, such as fluid flow rates, pressure, and composition may be monitored. These parameters may be used to determine various characteristics of the subterranean formation.

The oilfield data (e.g., static data, dynamic data, characteristics) may be referred to as the physical properties. At least in part, because the geological structures are hidden below the subsurface, uncertainty exists in each of the physical properties of the geological structures. In other words, because of the impossibility to obtain an image of the entire region, various interpolation and extrapolation techniques are used to estimate the geological properties across the subterranean formation (104) from the measured oilfield data that is gathered from data acquisition tools located at various locations in the oilfield.

In one or more embodiments, the oilfield data is received by the surface unit (112), which is communicatively coupled to the field management tool (116). Generally, the field management tool (116) is configured to analyze, model, control, optimize, or perform other management tasks of the aforementioned field operations based on the oilfield data provided from the surface unit (112). Although the surface unit (112) is shown as separate from the field management tool (116) in FIG. 1, in other examples, the surface unit (112) and the field management tool (116) may also be combined.

After the drilling operation is complete, the well may then be prepared for production. Wellbore completions equipment is deployed into the wellbore to complete the well in preparation for the production of fluid through the wellbore. Fluid is then allowed to flow from downhole reservoirs, into the wellbore and to the surface. Production facilities are positioned at surface locations to collect the hydrocarbons from the wellsite(s). Fluid drawn from the subterranean reservoir(s) passes to the production facilities via transport mechanisms, such as tubing. Various equipment may be positioned about the oilfield to monitor oilfield parameters, to manipulate the oilfield operations and/or to separate and direct fluids from the wells. Surface equipment and completion equipment may also be used to inject fluids into reservoir either for storage or at strategic points to enhance production of the reservoir.

In the vertical well shown in FIG. 1, a lateral of the vertical well is the borehole. Although FIG. 1 shows a vertical well, one or more embodiments may apply to a horizontal well and/or a multilateral well that extends horizontally through one or more subsurface formations. For example, in a horizontal well, the lateral may correspond to the single borehole trajectory. The single lateral of the horizontal or vertical well may have multiple zones isolated by packers and down hole flow control valves. In a multilateral well, multiple laterals may exist. FIG. 2 shows an example of a multilateral well (200) and a corresponding well model (202) in accordance with one or more embodiments of the technology.

FIG. 2 illustrates an example of a multilateral well (22) in accordance with one or more embodiments. In the example, the multilateral well (22) comprises a multilateral well having laterals (24), (26) and (28). Each lateral corresponds to a lateral bore or a separate borehole that extends from a primary borehole. FIG. 2 is an example and the multilateral well may have other numbers and arrangements of laterals. The multilateral well may have well completion systems (20). Well completion systems may include sections of tubing (30) which extend between and/or through various completion components, including packers (32) which isolate corresponding well zones (34). In particular, a well zone is a region along a lateral that is demarcated by two adjacent packers. In one or more embodiments of the technology, the well completion system (20) may include down hole flow control valves (36) which control fluid flows and fluid flow rates from the various corresponding well zones (34) into multilateral well completion systems (20). In other words, a down hole flow control valve controls the flow from the particular zone and any prior zones. Each down hole flow control valve may have configurable choke positions that are capable of being adjusted while downhole. The choke position specifies the amount of opening of the down hole flow control valve, and, thus, the amount of fluid that is capable of being passed through the down hole flow control valve.

For example, well fluid may flow from a surrounding formation (38), e.g. a hydrocarbon fluids bearing formation, and into well completion system (20) through down hole flow control valves (36) at corresponding well zones (34). The fluid is commingled after flowing through the down hole flow control valves (36) and the commingled fluid flow is directed up through tubing sections (30) to a wellhead (40) for collection. The wellhead (40) or other surface equipment also may comprise down hole flow control equipment (42), such as a valve or other type of choking device, to control flow rates and pressures at the surface as monitored and controlled by the surface unit (44) (discussed above with reference to FIG. 1).

Continuing with FIG. 2, the multilateral well model shown on the right side (202) of FIG. 2 is constructed to represent the various components of the multilateral well (22) including, for example, the inside and outside diameters of tubing sections (30), casing perforations in a cased well, depths of components (e.g. depths of down hole flow control valves, number and position of lateral bores), well zones, reservoir properties, fluid parameters, and types of completion equipment (e.g., types of down hole flow control valves). The multilateral well model may use static and dynamic data (discussed above with reference to FIG. 1).

The multilateral well model may further model the flow of downhole fluids and gas into the laterals and through the borehole based on reservoir properties, pressures, fluid data, choke positions, and/or other inputs data to the model. Once choke positions of down hole flow control valves are implemented based on the validated optimization scenarios, the multilateral well model may be continually recalibrated, which effectively continues the optimization loop.

In one or more embodiments, the wellsite system may include functionality to perform hydraulic fracturing operations. Hydraulic fracturing, or fracturing, is a process that uses fluid pressure to enhance well production, such as an oil and gas well, above natural production rates. Fluid pressure is applied to rock to overcome the earth stresses and strength of the rocks, causing the rock to part. Solid materials are then mixed with the fluid and pumped into the induced fracture to prevent closing of the fracture after the fluid pressure is removed. This process creates a large surface area through which hydrocarbons can flow and a pathway for those hydrocarbons to reach the well. The result is that the rate of flow is greatly increased compared to an un-stimulated well in the same reservoir.

Production design includes setting flow control valves, injection rates and other aspects of the system to optimize production of the oilfield. The techniques used in completion design, hydraulic fracturing, and production design, as well as drilling, may be repeated to extract additional fluid from the reservoir.

Turning now to FIGS. 3.1 and 3.2, the surface unit, field management tool, orchestrator computing system, user computing system, data repository, and other computing devices disclosed herein may be implemented on any combination of mobile, desktop, server, or other types of hardware. For example, as shown in FIG. 3.1, the computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), and numerous other elements and functionalities.

The computer processor(s) (302) may be an integrated circuit for processing instructions. For example, the computer processor(s) may be one or more cores or micro-cores of a processor. The computing system (300) may also include one or more input devices (310), such as a touchscreen, keyboard, mouse, microphone, touchpad, electronic pen, or any other type of input device.

The communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

Further, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments.

The computing system (300) in FIG. 3.1 may be connected to or be a part of a network. For example, as shown in FIG. 3.2, the network (320) may include multiple nodes (e.g., node X (322), node Y (324)). Each node may correspond to a computing system, such as the computing system shown in FIG. 3.1, or a group of nodes combined may correspond to the computing system shown in FIG. 3.1. By way of an example, embodiments may be implemented on a node of a distributed system that is connected to other nodes. By way of another example, embodiments may be implemented on a distributed computing system having multiple nodes, where each portion of the embodiments disclosed herein may be located on a different node within the distributed computing system. Further, one or more elements of the aforementioned computing system (300) may be located at a remote location and connected to the other elements over a network.

Although not shown in FIG. 3.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (322), node Y (324)) in the network (320) may be configured to provide services for a client device (326). For example, the nodes may be part of a cloud computing system. The nodes may include functionality to receive requests from the client device (326) and transmit responses to the client device (326). The client device (326) may be a computing system, such as the computing system shown in FIG. 3.1. Further, the client device (326) may include and/or perform at least some portion of one or more embodiments disclosed herein.

Figure 4:
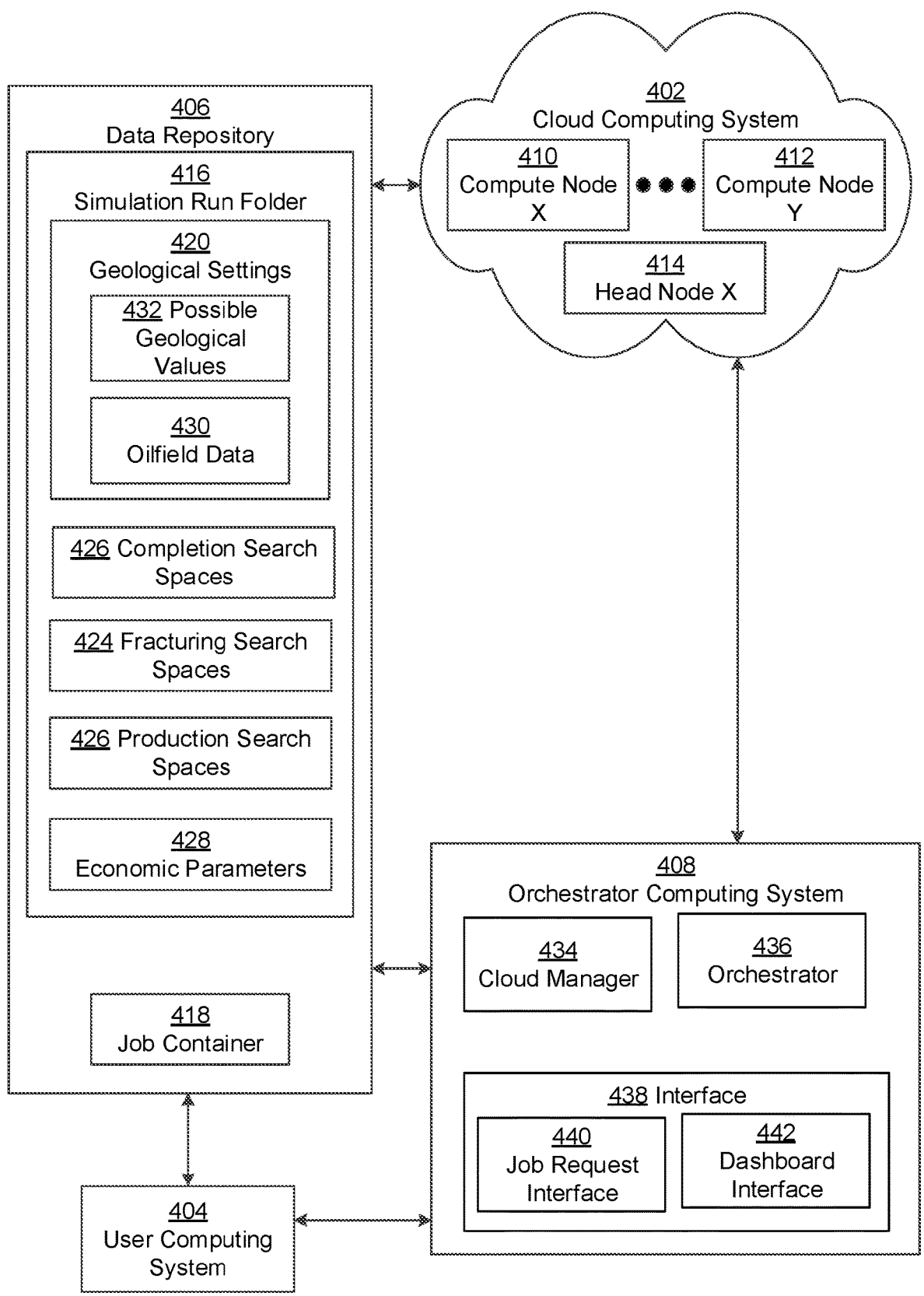

FIG. 4 shows a diagram of a system in accordance with one or more embodiments. As shown in FIG. 4, the system includes a cloud computing system (402) operatively connected to a data repository (406) and an orchestrator computing system (408). The orchestrator computing system (408) and the data repository (406) are also operably connected to a user computing system (404) in accordance with one or more embodiments. An operable connection is any direct or indirect, wired or wireless connection that performs data transmission. For example, the connection may be via a wire, Bluetooth, a network, or any other connection.

The cloud computing system (402) is a hardware and software infrastructure that has multiple compute nodes (e.g., compute node X (410), compute node Y (412)) and a head node (414). In other words, the cloud computing system is an on-demand computing system in which hardware and software resources in the compute nodes (e.g., compute node X (410), compute node Y (412)) are allocated to a task based on the requirements for the task. Each compute node may correspond to a computing system, such as the computing system described above with respect to FIGS. 3.1 and 3.2. A head node (414) includes functionality to manage the cloud computing system. The management may include adding and removing compute nodes to the cloud computing system, assigning tasks to particular compute nodes, performing any provisioning operations on the compute nodes, and/or performing any other tasks or collection of tasks.

The compute nodes (e.g., compute node X (410), compute node Y (412)) are configured and/or configurable to execute one or more simulators. In particular, specific simulators are often used in connection with specific oilfield operations, such as completion designs, hydraulic fracturing, reservoir production, network modeling, and other aspects. The simulators may simulate how particular values of various parameters affect an oilfield operation. Data fed into the simulator(s) may be historical data, real time data or combinations thereof. Simulation through one or more of the simulators may be repeated or adjusted based on the data received.

By way of some examples, simulators may include a reservoir simulator, fracture network simulator, a wellbore simulator, a finite-elements geomechanical simulator, and a surface network simulator. The reservoir simulator solves for hydrocarbon flowrate through the reservoir and into the wellbores. The wellbore simulator and surface network simulator solve for hydrocarbon flowrate through the wellbore and the surface gathering network of pipelines. A fracture network simulator simulates how various parameter values of hydraulic fracturing affects the stresses on the subsurface formation causing a fracture network. Simulators may include economics simulators. The economics simulator models the costs of part or the entire oilfield. Some of the simulators may be separate or combined, depending on the available systems.

The user computing system (404) is a computing device described above with reference to the FIG. 3.1. The user computing device (404) may correspond to the surface unit or another computing system connected to the surface unit. The user computing system (404) may include functionality to execute an oilfield management application (not shown). For example, the oilfield management application may include functionality to receive oilfield data (430), populate the data repository (406), generate models, and perform other tasks. Further, the oilfield management application in conjunction with the user computing system (404), the surface unit, and the wellsite equipment may include functionality to implement the well plan. In particular, the well plan may specify various parameters of oilfield equipment for completion, hydraulic fracturing, and production. The oilfield management application may include functionality to adjust at least some of the parameters to perform oilfield operations according to the well plan and extract hydrocarbons from the oilfield.

Continuing with FIG. 4, in one or more embodiments, the data repository (406) is any type of storage unit and/or device (e.g., a file system, database, collection of tables, or any other storage mechanism) for storing data. Further, the data repository (406) may include multiple different storage units and/or devices. The multiple different storage units and/or devices may or may not be of the same type or located at the same physical site. As shown in FIG. 4, the data repository includes functionality to store a simulation run folder (416) and a job container (418).

The simulation run folder (416) is a file structure that maintains parameters and other information that is used during simulations. For example, the simulation run folder (416) may include functionality to store geological settings, completion search spaces (422), fracturing search spaces (424), production search spaces (426), and economic parameters (428). The geological settings (420) may include oilfield data (430) and possible geological values (432) in accordance with one or more embodiments.

The oilfield data (430) includes the data described above with reference to FIGS. 1 and 2. In other words, the oilfield data (430) is data acquired by the data acquisition tools located at the oilfield. The oilfield data may include raw data (i.e., data as collected without any transformation performed), preprocessed data, and processed data. For example, preprocessing of the oilfield data may include validation operations, changing collected data from time domain to frequency domain, and/or performing other preprocessing actions. Processed data may be data which is analyzed to acquire one or more data models matching the data. For example, the data models may be a subsurface formation model, a reservoir model, a network model, or other model. When such models are acquired, uncertainty may exist in the oilfield data. The uncertainty may be captured as possible geological values (432). In other words, the possible geological values are ranges of values for each geological parameter that is considered valid for the geological parameter. The ranges are the ranges of geological uncertainty. More particularly, values in the range are possible values of the geological parameter that is consistent with the oilfield data acquired by the data acquisition tools while values outside of the range are predetermined to be inconsistent with the oilfield data acquired by the data acquisition tools. The ranges of geological uncertainty may be defined by a human, such as a geologist, and/or may be gathered using history matching or comparison with historical data acquired from the same oilfield and/or other oilfields. As used herein, the word "range" may include on a continuous scale or a discrete scale. For example, a "range" may be defined by specifying each value in a set of possible values or by specifying a minimum value and a maximum value for a continuous variable.

In one or more embodiments, the completion search spaces (426) are possible strategies for a completion design. In other words, the completion search spaces (426) may include ranges of values of parameters such as number of stages, possible placement of stages, distributions of stages in a multilateral well, and other possible parameters defining the completion. More particularly, the completion search spaces are ranges of values for the different parameters of a completion design.

In one or more embodiments, the fracturing search spaces (424) are possible strategies for performing treatment operations to hydraulically fracture a subsurface formation. In other words, the fracturing search spaces (424) may include ranges of values of parameters such as composition of material injected into the well, pressure of the injection, injection sites, duration of time of the injection, and other possible parameters. More particularly, the fracturing search spaces are ranges of values for the different parameters of a hydraulic fracturing strategy.

In one or more embodiments, the production search spaces (426) are possible strategies for producing hydrocarbons from a well that has undergone completion and hydraulic fracturing. For example, the production search spaces (426) may include ranges of values of parameters such as flow control valve positions, possible pumping schedules, and other aspects of a production operation.

The economic parameters (428) are parameters that define the cost of operations and the price of resulting hydrocarbons. The economic parameters may include historical, current, and projected future costs and prices. For example, the economic parameters may include the costs of operating particular pieces of oilfield equipment, number of days in which operations would be expected to occur to implement different well plans, labor costs, costs of raw materials, and other costs.

Continuing with the data repository (406), the job container (418) includes functionality to store a job request. A job request is a request for a set of simulations to obtain possible optional well plan(s). For example, the job request may include an identifier of the simulation run folder (416), number of compute nodes to use, maximum simulation time, when to start the simulations, identifiers of the simulators and sampling techniques to use, and other parameters or any combination thereof.

The orchestrator computing system (408) is operatively connected to the data repository, the user computing system (404), and the cloud computing system (402) in accordance with one or more embodiments. The orchestrator computing system (408) includes functionality to orchestrate the performance of simulations on the cloud computing system (402) in accordance with the job request. The orchestrator computing system (408) may include a cloud manager (434), an orchestrator (436), and an interface (438). The cloud manager (434) includes functionality to manage the selection of the cloud computing system. For example, the cloud manager (434) may identify any requirements to perform the job according to the job request and execute the job request accordingly. The orchestrator (436) is a software program that is configured to orchestrate the simulations on the cloud computing system (402). Performing the orchestration is described below with references to FIGS. 6-9.

The interface (438) may include an application programming interface (API) and/or graphical user interface (GUI) and includes functionality to interface with the user through the user computing system. For example, the interface may include a web interface that is accessible via a web browser. By way of another example, the API may include functionality to interface with the wellsite management application on the user computing device. In one or more embodiments, the interface (438) includes a job request interface (440) and a dashboard interface (442). The job request interface (440) includes functionality to guide a user through entering a job request. For example, the job request interface may include a set of fields and labels describing how to enter data to the fields. In some embodiments, the job request interface may be implemented as a widget.

The dashboard interface (442) includes functionality to present intermediate and final results from performing the job request as well as execution metrics. For example, the dashboard interface (442) may include the length of time to perform the experiments, links to obtaining current simulation results, expected production and economic factors for implementing a well plan according to the current simulation results, and any other data describing a simulation run. The dashboard interface may be defined by a set of graphs, charts and interface tools to present the information.

While FIG. 1-4 show a configuration of components, other configurations may be used without departing from the scope of the claims. For example, various components may be combined to create a single component. As another example, the functionality performed by a single component may be performed by two or more components.

FIGS. 5, 6, 7, 8, and 9 show flowcharts in accordance with one or more embodiments. While the various blocks in this flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not require a processor to process an instruction unless an interrupt is received to signify that condition exists in accordance with one or more embodiments. As another example, determination blocks may be performed by performing a test, such as checking a data value to test whether the value is consistent with the tested condition in accordance with one or more embodiments.

Figure 5:
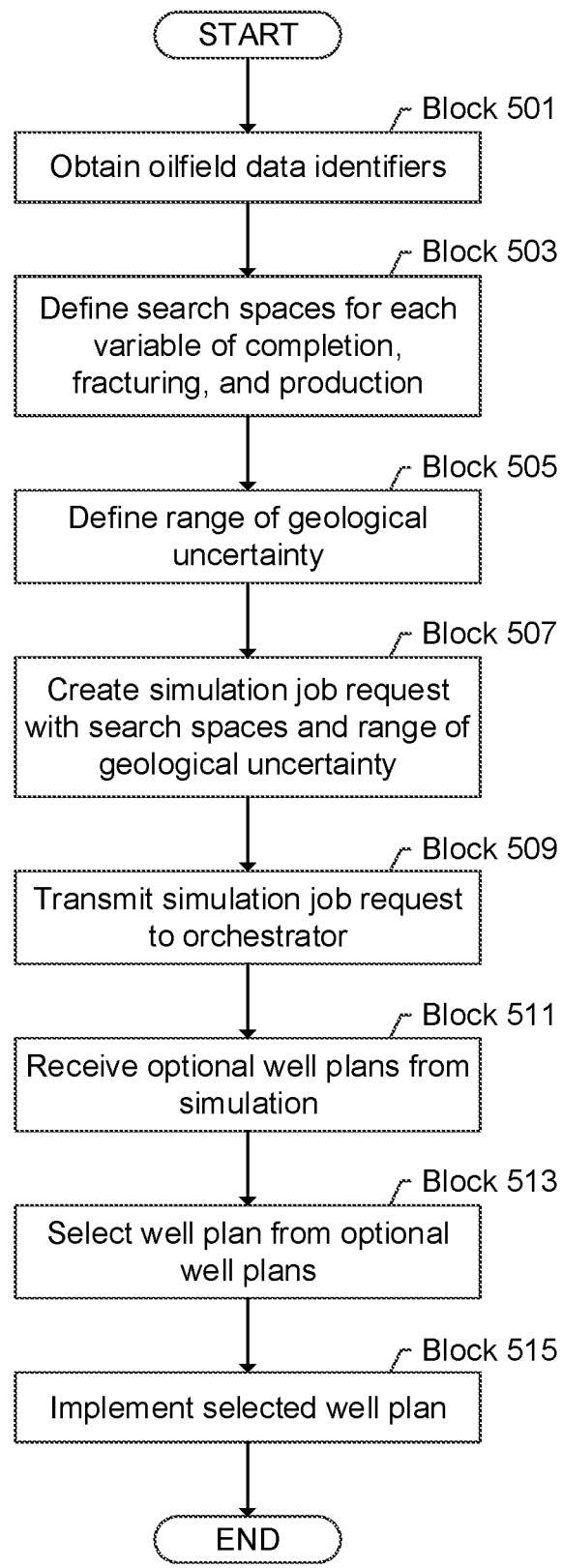
FIGS. 5, 6, 7, 8, and 9 show flowcharts in accordance with one or more embodiments.

FIG. 5 shows a flowchart for a user computing system to create a job request and populate a simulation run folder in accordance with one or more embodiments. In Block 501, oilfield data identifiers are obtained in accordance with one or more embodiments. For example, the oilfield data identifiers are obtained from the user computing device interacting with the user and/or the surface unit. In particular, as data acquisition tools on the oilfield are populating the data repository with oilfield data via the surface unit, the oilfield data is associated with identifiers describing the location of acquisition. Various levels of processing may be performed on the acquired oilfield data with or without the user's involvement to create processed data, which is assigned an identifier. In general, large volumes of oilfield data may be acquired and produced for a single oilfield. Thus, user computing device may reference individual data items in the large volume using the unique identifier of the individual data items, may reference the large volumes as a whole using an identifier of the oilfield, may reference types of data in the large volumes using an identifier of the oilfield and type (e.g., seismic data from oilfield location X), or may use another identifier to reference the oilfield data. The obtaining of the identifiers may be performed with or without user interaction.

In Block 503, search spaces for each variable of completion, fracturing, and production are defined in accordance with one or more embodiments. In one or more embodiments, the search spaces are defined based on experience that the user may have and historical data. In other words, the search spaces are the various possible configurations of oilfield operations that the user may want to test. The search spaces may be obtained as suggestions from other oilfields, may be obtained from the user based on the user's experience, or may be selected based on similarity and to broaden the range of testing. In one or more embodiments, the selection of search spaces may be via receiving data via graphical user interface widgets being populated by the user. In one or more embodiments, data mining a data repository of other oilfields may be used as well as performing a statistical analysis on oilfield data. Because a cloud computing system is used, the breadth of searching may be increased to accommodate a wide variety of scenarios. Thus, the oilfield engineer is not limited to analyzing the known configurations of oilfield operations, but is allowed to experiment with additional configurations that may not have been used in the past.

In Block 505, ranges of geological uncertainty are defined in accordance with one or more embodiments. In other words, for each oilfield data item that may have uncertainty (i.e., the value is not known with certitude), a range may be defined for the oilfield data item. The range may be based on a statistical analysis on the different possible values that the oilfield data item may take to identify the amount of variation given the geological conditions. In one or more embodiments, the analysis may be performed automatically using data mining techniques from other oilfields and/or may be performed by the user computing system interacting with the user via a graphical user interface.

In Block 507, a simulation job request with the search spaces and the ranges of geological uncertainty is created in accordance with one or more embodiments. In other words, the search spaces may be stored in the simulation run folder with the identifiers of the ranges of uncertainty. The user computing system with the user may define parameters of the simulation job request including the reference to the simulation run folder, the number of experiments to execute, and any other parameters.

In Block 509, the simulation job request is transmitted to the orchestrator in accordance with one or more embodiments. The transmission may be direct or indirect, such as via the data repository. By way of another example, the simulation job request may be stored in the data repository and the orchestrator may be notified that the simulation job request is ready for execution.

Once received, the orchestrator manages the execution of the job. Management executing of the simulation job is described below with reference to FIG. 6. At this stage, the user with the user computing system may take various actions with respect to the simulation job request. Example interactions are described below with reference to FIGS. 10-14.2.

Continuing with FIG. 5, in Block 511, optional well plans are received from the simulation in accordance with one or more embodiments. The optional well plan(s) define possible configurations of the oilfield operations that the simulation considers may be optimal or within a threshold to optimal for the various parameters and oilfield. The optional well plans may be received directly or via the data repository. For example, the user computing device may receive a notification that the optional well plans are available in the data repository.

In Block 513, if more than one optional well plan exists, a well plan is selected from the set of optional well plans. For example, using the user interface, the user may view the various parts of each optional well plan. In other words, the user, based on past experience, knowledge of the particular field, and other considerations, the user using the user computing system may select an optional well plan that the user considers optimal. By way of another example, the selection may be performed automatically by the user computing system.

In Block 515, the selected well plan is implemented in accordance with one or more embodiments. In other words, the oilfield equipment is physically adjusted to perform the operations specified in the well plan. Because of the number of variations that are allowed and the number of simulations that may be executed, the selected well plan may not correspond to one that the user would normally select. In other words, one or more embodiments allow for increasing the search space of possible well plans in order to maximize production and/or profit from the oilfield. Further, by providing simulations from completion through fracturing and production, one or more embodiments account for the interrelationship between the different aspects of the oilfield operations.

Figure 6:
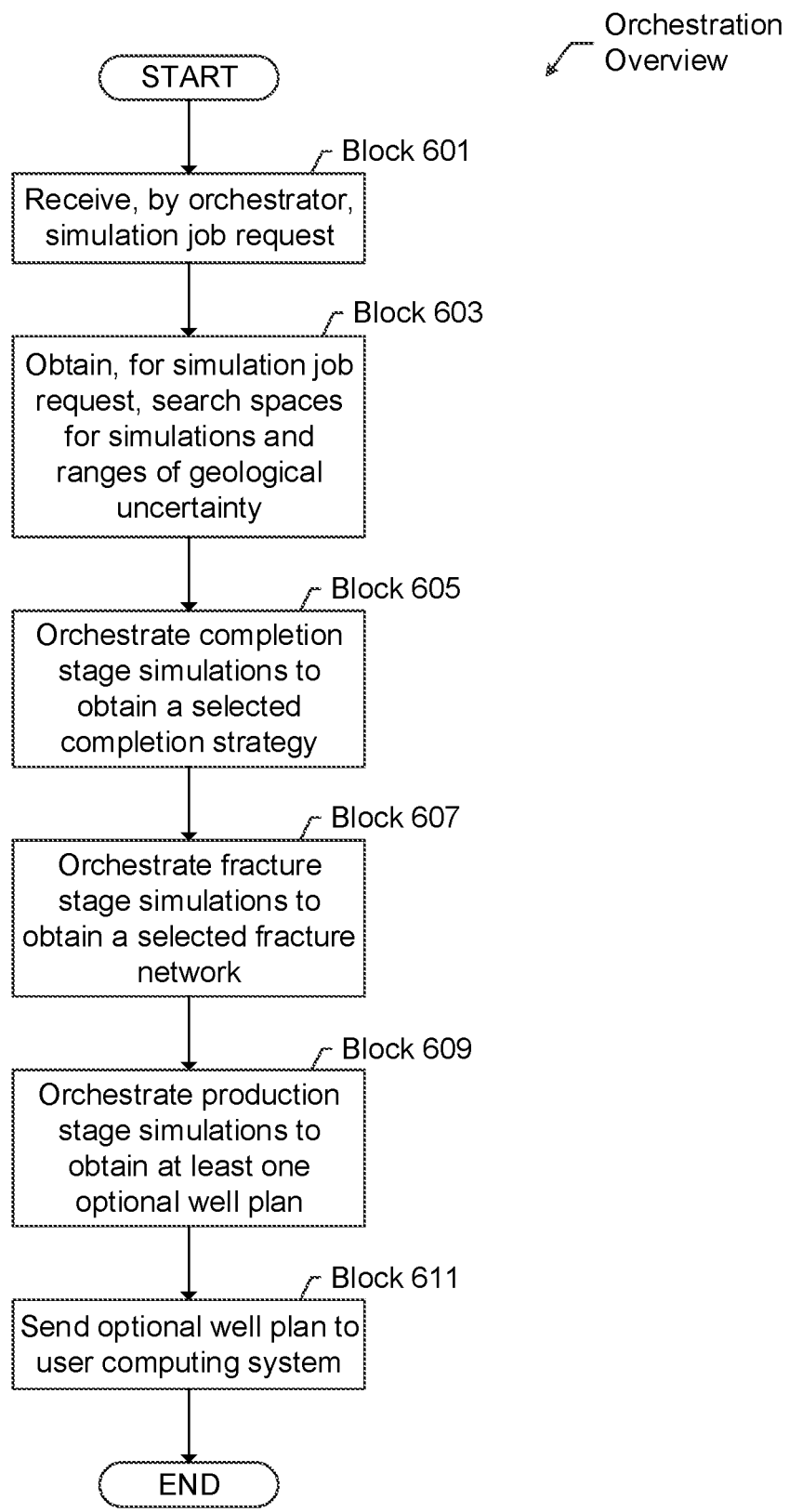

FIG. 6 shows a flowchart for an orchestrator to orchestrate the simulations on a cloud computing system. In Block 601, the orchestrator receives a simulation job request. Communication with the orchestrator may be performed asynchronously. For example, the simulation job request may be populated into a job request queue.

In Block 603, for the simulation job request, the search spaces for the simulations and the ranges of geological uncertainty are obtained in accordance with one or more embodiments. In one or more embodiments, as discussed above, the simulation job request references the simulation run folder. Obtaining the search spaces and the ranges may be performed by accessing the simulation job request and identifying the simulation run folder. By accessing the simulation run folder, the orchestrator may request transmission of the simulation run folder from the data repository to the orchestrator computing device. By way of another example, the orchestrator may request validation of the simulation run folder and may access the simulation run folder remotely. In other words, rather than using a local copy of the simulation run folder, the orchestrator may access the remote copy of the simulation run folder for performing the operations discussed below.

In Block 605, the orchestrator orchestrates the completion stage simulations to obtain a selected completion strategy in accordance with one or more embodiments. In one or more embodiments, the orchestrator performs the end to end orchestration for performing multiple experiments to simulate different completion designs. In other words, the orchestrator creates the experiments for particular simulations runs, manages the transfer of the oilfield data for the simulations, selects the cloud computing system to perform the simulations, provides any simulators used in the simulations, handles encryptions and decryptions, and performs other tasks. The orchestrator may then receive and aggregate the simulation results to select a completion strategy. Orchestrating the completion stage simulations is discussed below with reference to FIG. 7.

In Block 607, the orchestrator orchestrates the fracture stage simulations to obtain a selected fracture network. Using the selected completion strategy, the orchestrator may orchestrate the fracture stage simulations. Similar to the completion stage simulations, the orchestrator may perform the end to end orchestration for performing multiple experiments to simulate different hydraulic fracturing operations. Each fracturing operation may result in a different fracture network. The orchestrator may then receive and aggregate the simulation results to select a fracturing strategy and corresponding fracture network. Orchestrating the completion stage simulations is discussed below with reference to FIG. 8.

In Block 609, the orchestrator orchestrates the production stage simulations to obtain at least one optional well plan in accordance with one or more embodiments. As discussed above, both natural and manmade fractures affect the production from the oilfield. Thus, the fracture network is used in the production stage simulations to create a well plan that include the production. Similar to the completion stage simulations, the orchestrator may perform the end to end orchestration for performing multiple experiments to simulate different production operations based on the fracture network. Each experiment may have different costs and amounts and compositions of hydrocarbons produced. The orchestrator may then receive and aggregate the simulation results to select at least one optional well plan. Orchestrating the production stage simulations is discussed below with reference to FIG. 9.

In Block 611, the orchestrator sends the optional well plan to the user computing system in accordance with one or more embodiments. For example, the orchestrator may populate the simulation run folder or another folder in the data repository with the optional well plan and electronically send a notification to the user computing system indicating that the optional well plan is available. By way of another example, the orchestrator may send the optional well plan to the user computing system directly. By way of another example, the interface on the orchestrator computing system may be used to interact with the user and provide the optional well plan.

Although FIG. 6 shows the various blocks in sequential order, one or more of the blocks may be performed concurrently without departing from the scope of the claims. For example, ranges of geological uncertainty may be combined with completion, fracturing and production search spaces to sample across the four stages and create a representative set of end-to-end experiments. The experiments may be distributed to compute nodes for number crunching. In other words, rather than just sequentially sampling and simulating across each search space, sampling and simulating across all four stages may be performed concurrently.

Figure 7:
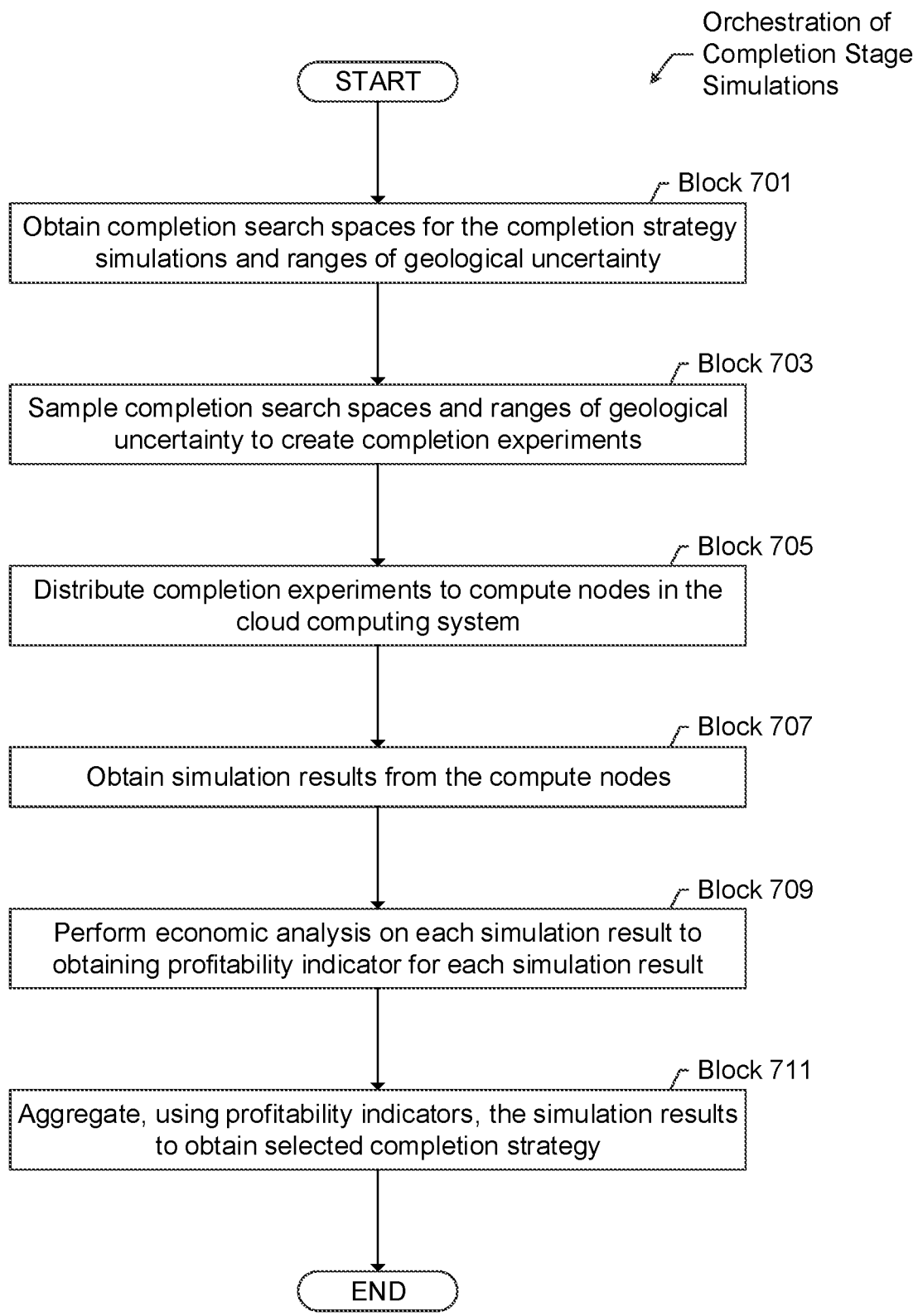

FIG. 7 shows a flowchart for orchestrating completion stage simulations in accordance with one or more embodiments. The Blocks of FIG. 7 may be performed, for example, by the orchestrator. In Block 701, completion search spaces for the completion strategy simulations and the ranges of the geological uncertainty are obtained.

In Block 703, the completion search spaces and ranges of geological uncertainty are sampled to create completion experiments. The sampling selects a value for each variable that is used in a single completion stage simulation run. In other words, each experiment has a value or set of values for each simulation run. Various sampling techniques may be used to sample the completion search spaces and the ranges of geological uncertainty. Moreover, different sampling techniques may be used for different variables. For example, one sampling technique may be used for number of stages and another sampling technique may be used for the location of the stage. The sampling technique that is used may be default, configured in the job request, or otherwise configured. In general, the sampling technique(s) used to create the experiments create a broad range of experiments that is representative of the overall search spaces. The sampling technique may also create additional experiments that are more often or more likely to be used. Because of the large number of computing devices that may execute the experiments, a large number of experiments may be created from the sampling technique.

In Block 705, the completion experiments are distributed to compute nodes in the cloud computing system in accordance with one or more embodiments. In one or more embodiments, the orchestrator sends a request with the experiments to the head node in the cloud computing system. The experiments may be in the request or identified in the requests. The head node may distribute the experiments to the compute nodes based on information in the request and the availability of resources in the compute nodes. Accordingly, the compute nodes process the request. In other words, each compute node executes at least one simulation according to the experiment and returns a simulation result.

In Block 707, the orchestrator receives the simulation results from the compute nodes in accordance with one or more embodiments. The orchestrator may receive the simulation results directly from the compute nodes, via the head nodes, via the data repository, and/or via another entity.

In Block 709, the orchestrator may perform an economic analysis on each simulation result to obtain profitability for the simulation result. The economic analysis may analyze the cost of the completion strategy and the range of possible resulting production to generate an expected profit or profit range from the completion strategy.

In Block 711, the simulation results are aggregated using the profitability indicator to obtain a selected completion strategy in accordance with one or more embodiments. In one or more embodiments, the completion strategy that has the highest expected profit or profit range is selected. In other embodiments, other factors may be considered such as risk and likelihood of achieving the expected profit.

Rather the economic analysis, other factors may be applied to select the completion strategy. The factors used to select the completion strategy may be configurable and selected by a user.

In one or more embodiments, rather than selecting a single completion strategy, multiple completion strategies may be selected. In such a scenario, each of the selected completion strategies may be used in later stages of the simulations.

Figure 8:
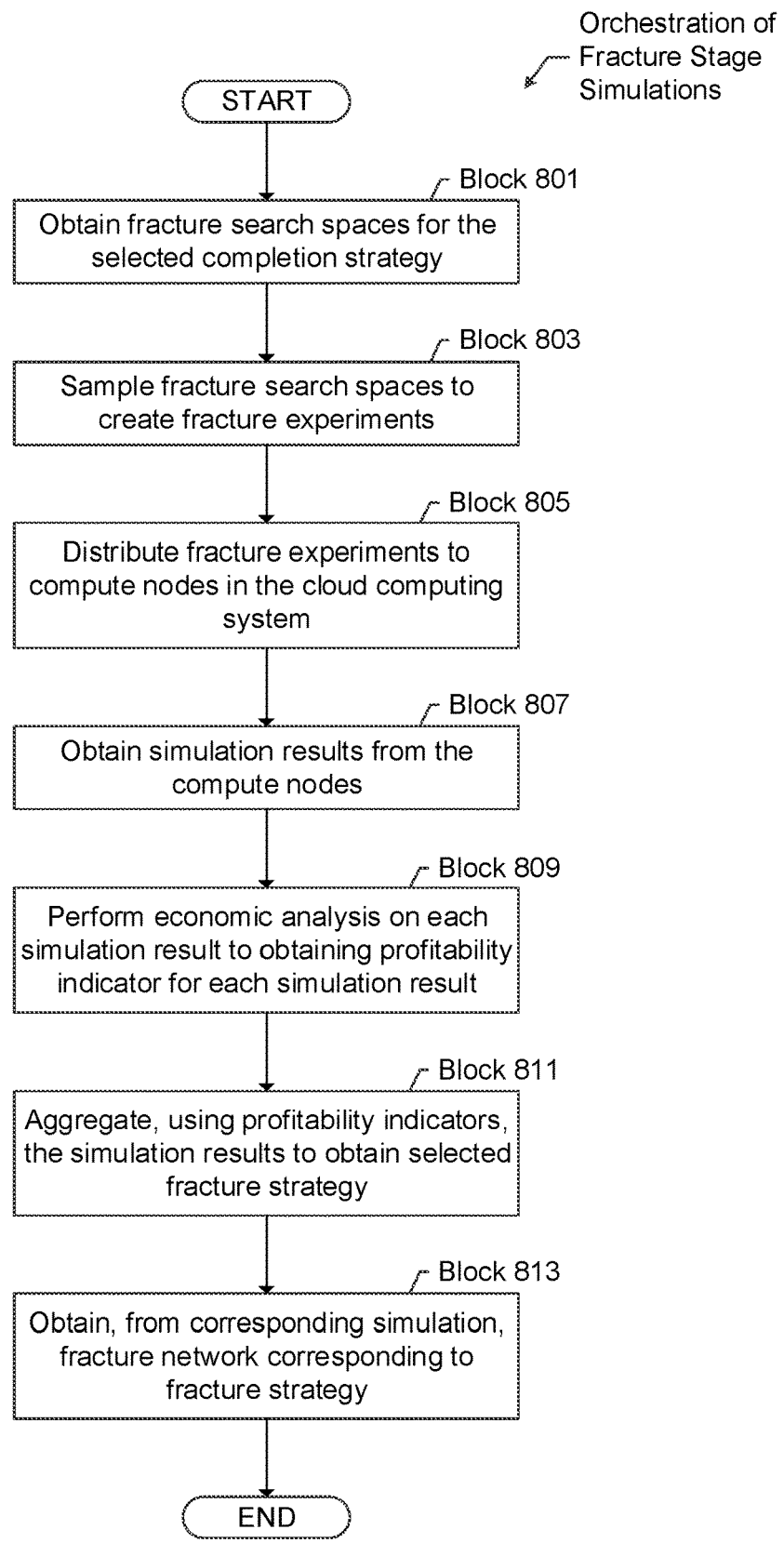

FIG. 8 shows a flowchart for performing fracture stage simulations in accordance with one or more embodiments. The Blocks of FIG. 8 may be performed, for example, by the orchestrator. In Block 801, fracture search spaces for the selected completion strategy or strategies are obtained. In other words, the fracture search spaces that are obtained match a completion strategy that is selected in the prior stage simulations. For example, a fracture search space may be narrowed to remove possible values of variables that are inconsistent with the selected completion strategy. By way of another example, the fracture search spaces that are obtained may be based on the number and position of the stages.

In Block 803, the fracture search spaces are sampled to create fracture experiments. The sampling selects a value for each variable that is used in a single fracture stage simulation run. In other words, each experiment has a value or set of values for each simulation run. As with sampling in the completion stage simulations, various sampling techniques may be used to sample the fracture search spaces, and different sampling techniques may be used for different variables. The sampling technique that is used may be default, configured in the job request, or otherwise configured. As with the completion stage simulations, the sampling technique(s) used to create the experiments create a broad range of experiments that is representative of the overall search spaces. The sampling technique may also create additional experiments that are more often or more likely to be used. Because of the large number of computing devices that may execute the experiments, a large number of experiments may be created from the sampling technique.

Each experiment has the values of variables for the fracture search spaces, the corresponding selected completion strategy, and the values of the geological variables that correspond to the selected completion strategy.

In Block 807, the fracture experiments are distributed to compute nodes in the cloud computing system in accordance with one or more embodiments. In one or more embodiments, the orchestrator sends a request with the experiments to the head node in the cloud computing system. The experiments may be in the request or identified in the requests. The head node may distribute the experiments to the compute nodes based on information in the request and the availability of resources in the compute nodes. Accordingly, the compute nodes process the request. In other words, each compute node executes at least one simulation according to the experiment and returns a simulation result. Each simulation result may be a corresponding fracture network that is expected from the fracturing strategy.

In Block 809, the orchestrator receives the simulation results from the compute nodes in accordance with one or more embodiments. The orchestrator may receive the simulation results directly from the compute nodes, via the head nodes, via the data repository, and/or via another entity.

In Block 811, the orchestrator may perform an economic analysis on each simulation result to obtain profitability for the simulation result. The economic analysis may analyze the cost of the fracture strategy, and the range of possible resulting production that is expected from the corresponding fracture network, to generate an expected profit or profit range from the fracture strategy.

In Block 813, the simulation results are aggregated using the profitability indicator to obtain a selected fracture strategy in accordance with one or more embodiments. In one or more embodiments, the fracture strategy that has the highest expected profit or profit range is selected. In other embodiments, other factors may be considered such as risk and likelihood of achieving the expected profit.

Rather the economic analysis, other factors may be applied to select the fracture strategy. The factors used to select the fracture strategy may be configurable and selected by a user.

In Block 813, the fracture network is obtained that corresponds to the selected fracture strategy. In other words, the fracture strategy or strategies and corresponding fracture networks may be used in later stages of simulations.

Figure 9:
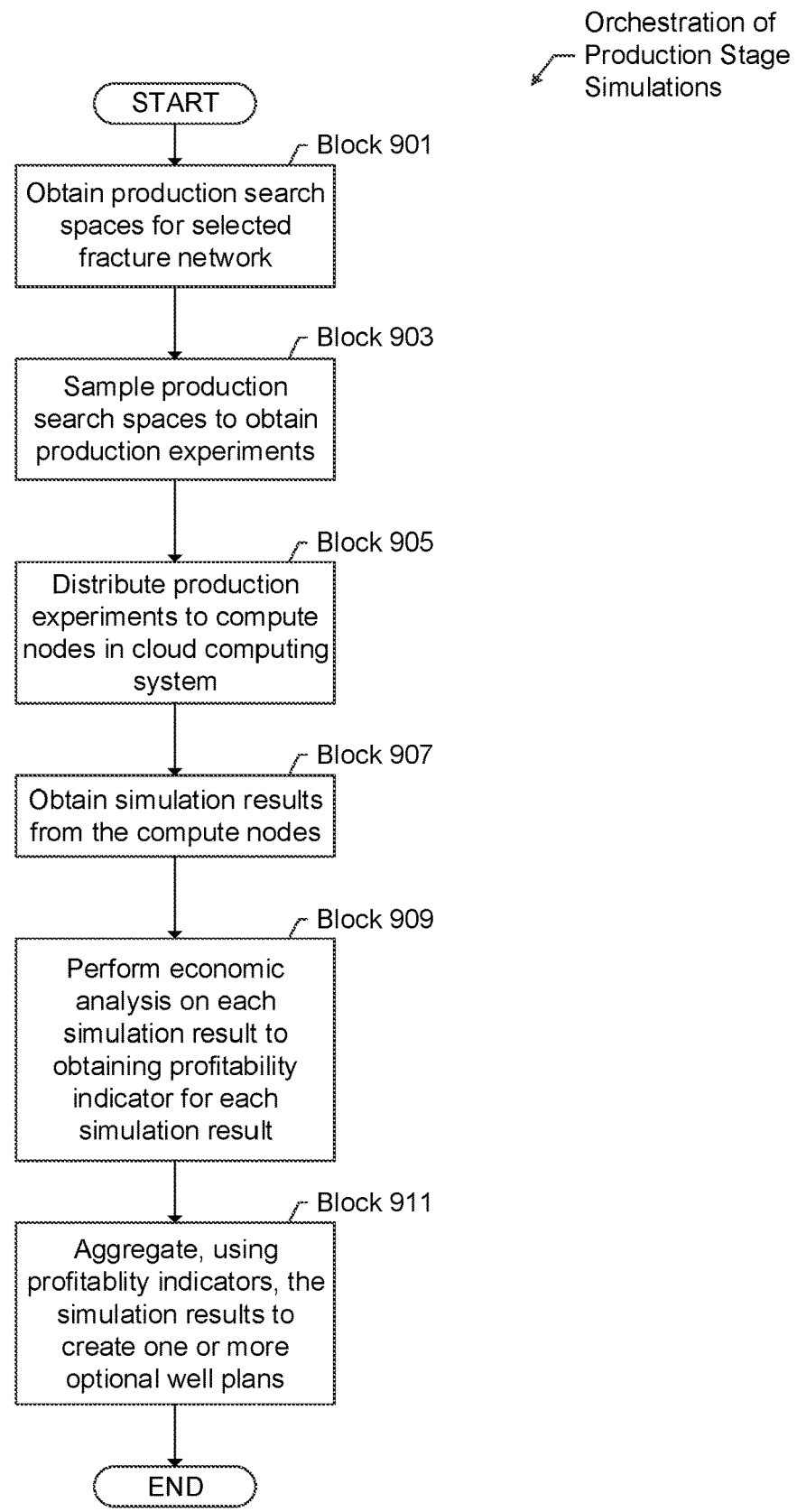

FIG. 9 shows a flowchart for performing production stage simulations in accordance with one or more embodiments. The Blocks of FIG. 9 may be performed, for example, by the orchestrator. In Block 901, production search spaces for the selected fracture network or networks are obtained. As discussed above, the production search spaces that are obtained match a fracture strategy that is selected in the prior stage simulations.

In Block 903, the production search spaces are sampled to create production experiments. The sampling of the production search spaces may be performed in a sample or similar manner as sampling the completion and fracture network search spaces as discussed above. Each experiment generated by the sampling has the values of variables for the production search spaces, the fracture network, the corresponding selected completion strategy, and the values of the geological variables that correspond to the selected completion strategy.

In Block 907, the production experiments are distributed to compute nodes in the cloud computing system in accordance with one or more embodiments. Distributing the experiments may be performed in a same or similar manner to distributing the experiments for the production strategy. Each simulation result may be a corresponding amount of production that is expected from the production strategy.

In Block 909, the orchestrator receives the simulation results from the compute nodes in accordance with one or more embodiments. The orchestrator may receive the simulation results directly from the compute nodes, via the head nodes, via the data repository, and/or via another entity.

In Block 911, the orchestrator may perform an economic analysis on each simulation result to obtain profitability for the simulation result. The economic analysis may analyze the cost of the production strategy, and the range of possible resulting production that is expected from the corresponding production network, to generate an expected profit or profit range from the production strategy.

In Block 913, the simulation results are aggregated using the profitability indicator to obtain one or more optional well plans in accordance with one or more embodiments. In one or more embodiments, the optional well plans that have the highest expected profit or profit range is selected. In other embodiments, other factors may be considered such as risk and likelihood of achieving the expected profit. Rather the economic analysis, other factors may be applied to select the optional well plans. The factors used to select the optional well plans may be configurable and selected by a user.

FIGS. 10-14.2 show examples in accordance with one or more embodiments. The various examples are for explanatory purposes and not intended to limit the scope of the claims.

In the example, a geological model is created with a definition of the structural lithology and properties such as permeability, porosity, fluid saturation distribution and rock properties such as minimum in-situ stress, young's modulus etc. If the formation is naturally fractured, then the geological model may include the location, length and azimuth of these natural fractures in the reservoir. The geological model may exhibit uncertainty.

Using the geological model, a well completion is designed. The well completion design involves the segmentation of the well in one or more stages in order to cover the pay section through one or multiple stages of hydraulic fracturing treatments. Further, the location of the actual perforations to be done may be identified so that the hydraulic fractures may initiate in these perforations and propagate to cover the desired pay section.

The design of the hydraulic fracture in the workflow involves creating treatment design scenarios with actual treatment fluid and proppant schedules. The simulation models are then run on these schedules to predict the fracture propagation, fluid and proppant placement and the ultimate fracture geometry achieved. Once the treatment is executed on the wellsite, the treatment data which includes treatment pressure, proppant concentration, pumping rates and microseismic hydraulic fracture monitoring data can be used to re-calibrate the stimulation design model by matching the observed parameters against the predicted parameters from the simulation run. The matching exercise changing the reservoir properties in the geological model or changing the fracture design parameters and fluid properties.

Once a match of the predicted versus observed data within a threshold is attained, then the hydraulic fractures and the reservoirs are gridded in reservoir grids. The reservoir grids may be used as input for the reservoir simulation. The reservoir simulation may include a production and/or a history match of the production data.

The various blocks above may be performed using the cloud computing system and the orchestrator. In particular, rather than limiting the oilfield design to a minimal number of possible configurations, a wide variation of configurations may be used.

Figure 10:
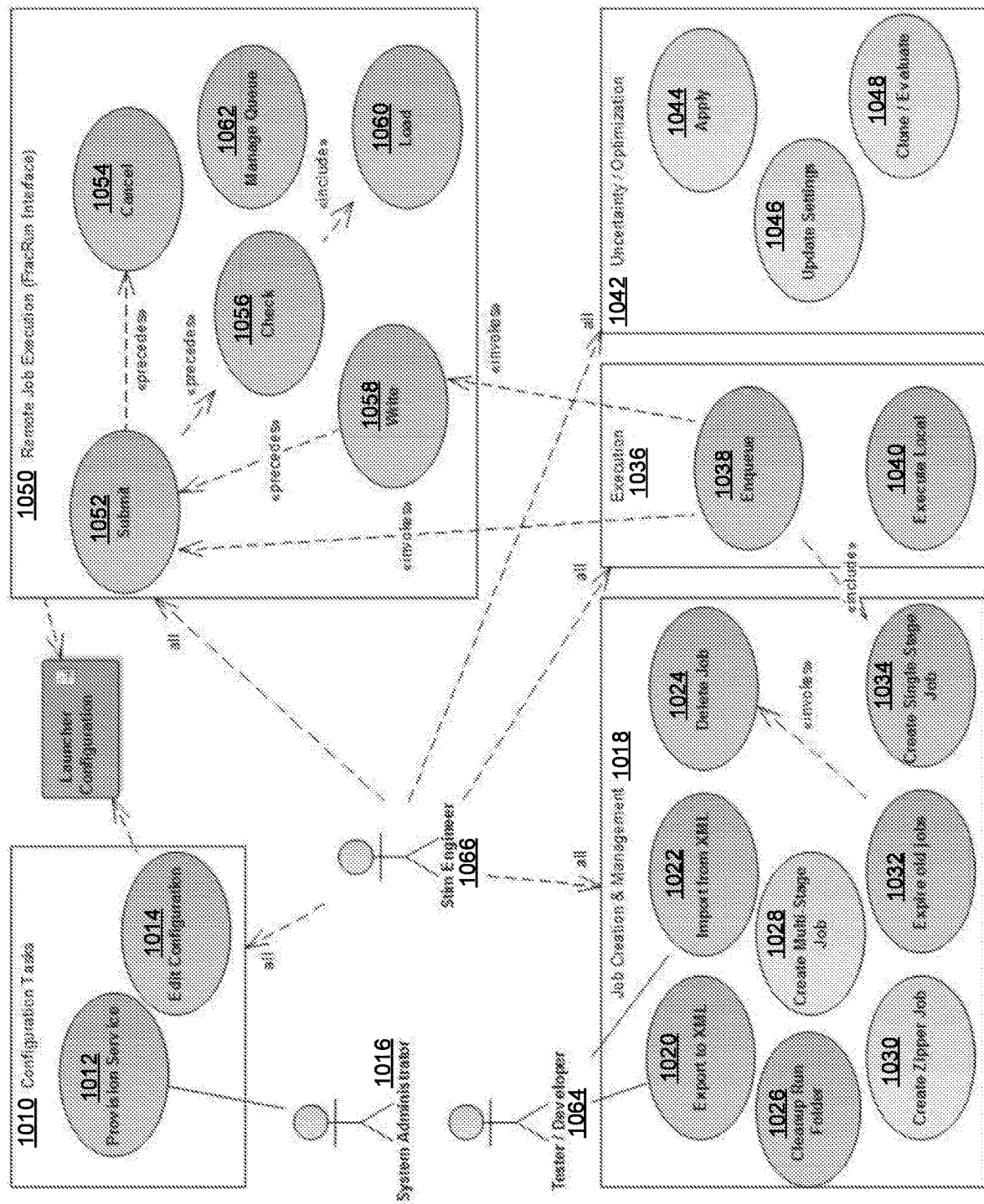

FIG. 10 shows an example of various tasks that users may perform in accordance with one or more embodiments. Configuration tasks (1010) may include a provision service (1012) and an interface to edit a configuration (1014). A system administrator (1016) may manage the provisional service.

Job creation and management (1018) may include an ability to export the job to extensible markup language (1020), import a document from extensible markup language (1022), delete a job (1024), cleanup the simulation run folder (1026), create a multi-stage job (1028), create a zipper job (1030), expire old jobs (1032), and create a single stage job (1034). A multi-stage job (1028) may be a job having multiple stages, such as completion stage simulation, fracture stage simulation, etc. A single stage job (1034) is a simulation job that has a single simulation. One or more embodiments may support both a multi-stage and a single-stage simulation.

Execution (1036) includes placing the job in a job queue (1038) and executing a local copy of the job (1040). Uncertainty and optimization (1042) including applying the job (1044), updating settings (1046), and cloning and evaluating the job (1048). Applying the job (1044) may include performing in-project operations for the job, creating and modifying pump schedules and treatment designs or performing other tasks.

Remote job execution (1050) may include submitting a job (1052), canceling a job (1054), checking on the status of the job (1056), and writing a job (1058). Remote job execution (1050) may include loading a job (1060) and managing a job queue (1062).

The tester/developer (1064) may perform the job creation and management (1018). A STIM Engineer (1066) may perform various aspects of the simulation management in accordance with one or more embodiments.

The following table summarizes the various Actions in FIG. 10.

| Actor | Use Case | Description |
|---|---|---|
| System Administrator | Provision Service | Configure billing. Allocate cluster resources. Generate certificates. Define users. Define storage . . . |
| End user | Edit Configuration | Specify parameters for jobs that run at a remote location (e.g.: location of the local fracture simulation folders, extra command-line argument, etc . . .) |
| End user | Execute Simulation Locally | Execute a single fracture simulation immediately |
| End user | Queue remote simulation | Queue a single stage Fracture Simulation job to run asynchronously on a remote cluster |
| End user | Create Single Stage Job | Create a job that includes a single stage simulation with no dependencies on other simulations |
| End user | Delete Job | If a job is pending, cancel it. Delete the job from the project. Delete the job folder (if one exists) |
| End user | Expire old jobs | Delete jobs that are no longer relevant to the project. |
| End user | Write Input Files | Create the simulator run folder. Write the simulator input files |
| End user | Submit Job to Cluster | Submit a request for the cluster to execute a job |
| End user | Check Job Status | Check the status of a job. Update the contents of the simulator run folder |
| End user | Cancel job | Cancel a job. If the job is pending, remove it. If the job is running, terminate it. |
| End user | Load results | Load the result data from the local simulation run folder in the user computing system. |
| System Administrator | Monitor Job Queue | Display the name and the status of each job in the job queue. Enable jobs to be cancelled or re-queued. |
| End user | Load Incomplete Results | Load data from a simulation run folder before the simulation has finished. |
| Developer/ Tester | Export Job to XML | Convert a job and its constituent tasks into an XML document |
| Developer/ Tester | Import Job from XML | Create a new job and tasks using data read from an XML document |
| End user | Create Multi-Stage Job | Create a job consisting of several fracture simulations to run in sequence |
| End user | Create Zip-Frac Job | Create a job to simulate a zipper frac: a multiple-stage simulation involving two wells |
| End user | Update Multi-Stage Settings | Edit the common settings for a multi-stage job. |
| End user | Clone/Evaluate Job | Create a new instance of a job by assigning unbound variables. |

| Actor | Use Case | Description |
| --- | --- | --- |
| End user | Apply Job Settings | Perform the in-project operations for a job. Create or modify pump schedules and treatment designs |

A dashboard may be displayed that includes a list of Fracture Jobs and Simulation Results as object types. Users may be able to submit queue simulations to run on a cluster, check the status of pending jobs, load results, and cancel jobs. Users may be able to delete simulation results. Users may be able to re-run jobs that have been defined previously. The users operations may be performed via the user computing system.

FIGS. 11-14.2 are example timing diagrams. The actions performed and the order of the actions may deviate from example timing diagrams without departing from the scope of the claims, unless explicitly specified in the claims. Further, actions and actors that are the same in the different example diagrams use the same reference numbers.

Figure 11:
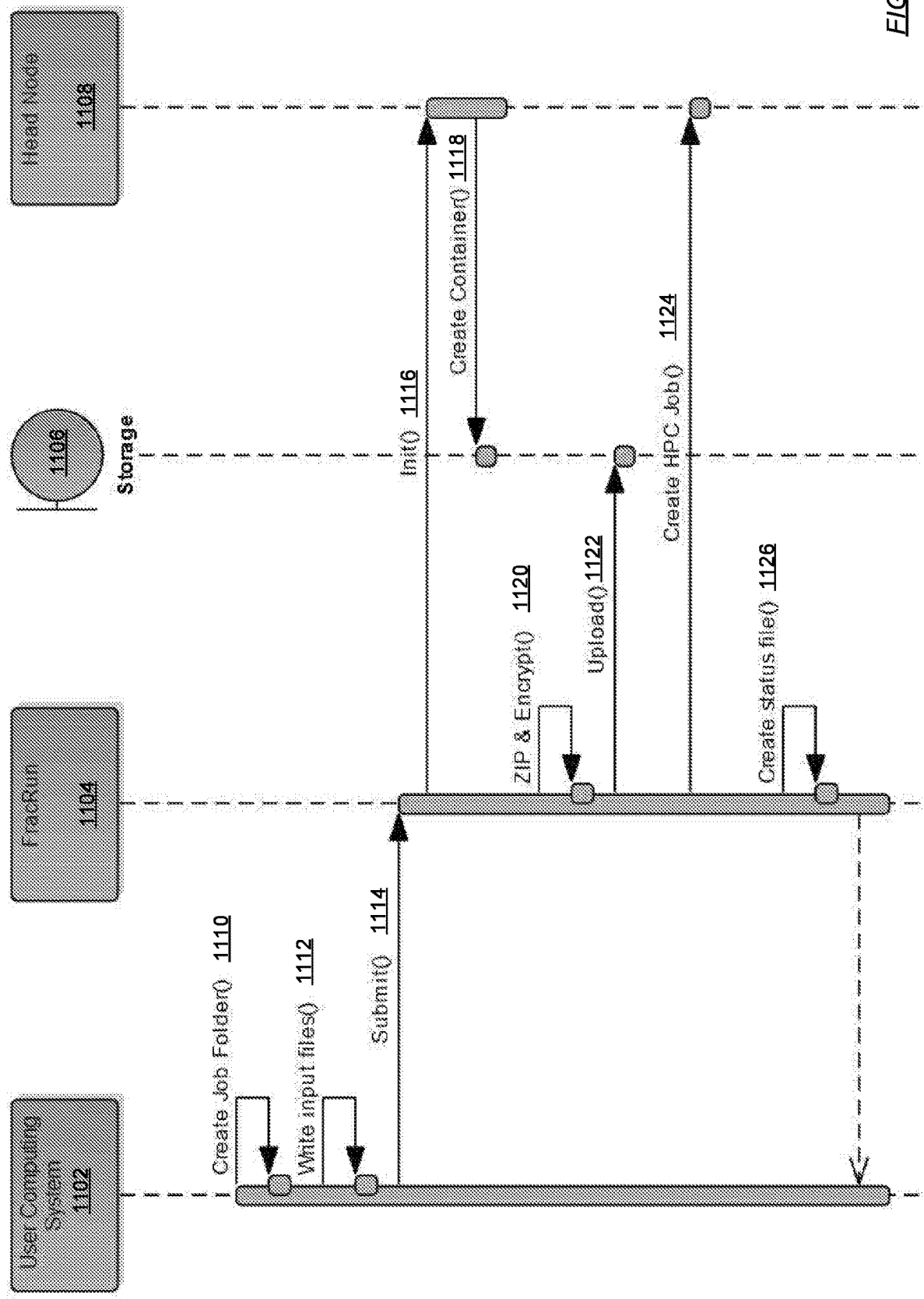

FIG. 11 shows an example timing diagram in accordance with one or more embodiments. In particular, FIG. 11 shows an example for a user using a user computing system to submit a job to execute. As shown in FIG. 11, a user computing system (1102) interacts with FracRun (1104), which interacts with storage (1106). The storage (1106) interacts with a head node (1108). FracRun (1104) is an example of an orchestrator and storage (1106) is an example of a data repository. User computing system (1102) creates a simulation run folder (1110). User computing system writes the simulation input files (1112). User computing system invokes FracRun (1114). FracRun requests (1116) the head node allocates a storage container for the job (1118). FracRun packages the local simulation run folder (as a ZIP archive) and encrypts the file using the local user certificate (1120). FracRun uploads the encrypted input data to the job storage container (1122). FracRun queues a new high performance computing (HPC) batch job to run on the head node (1124). FracRun records the job ID, the job container, and other pertinent details in the job status file in the local simulation folder (1126).

Figure 12:
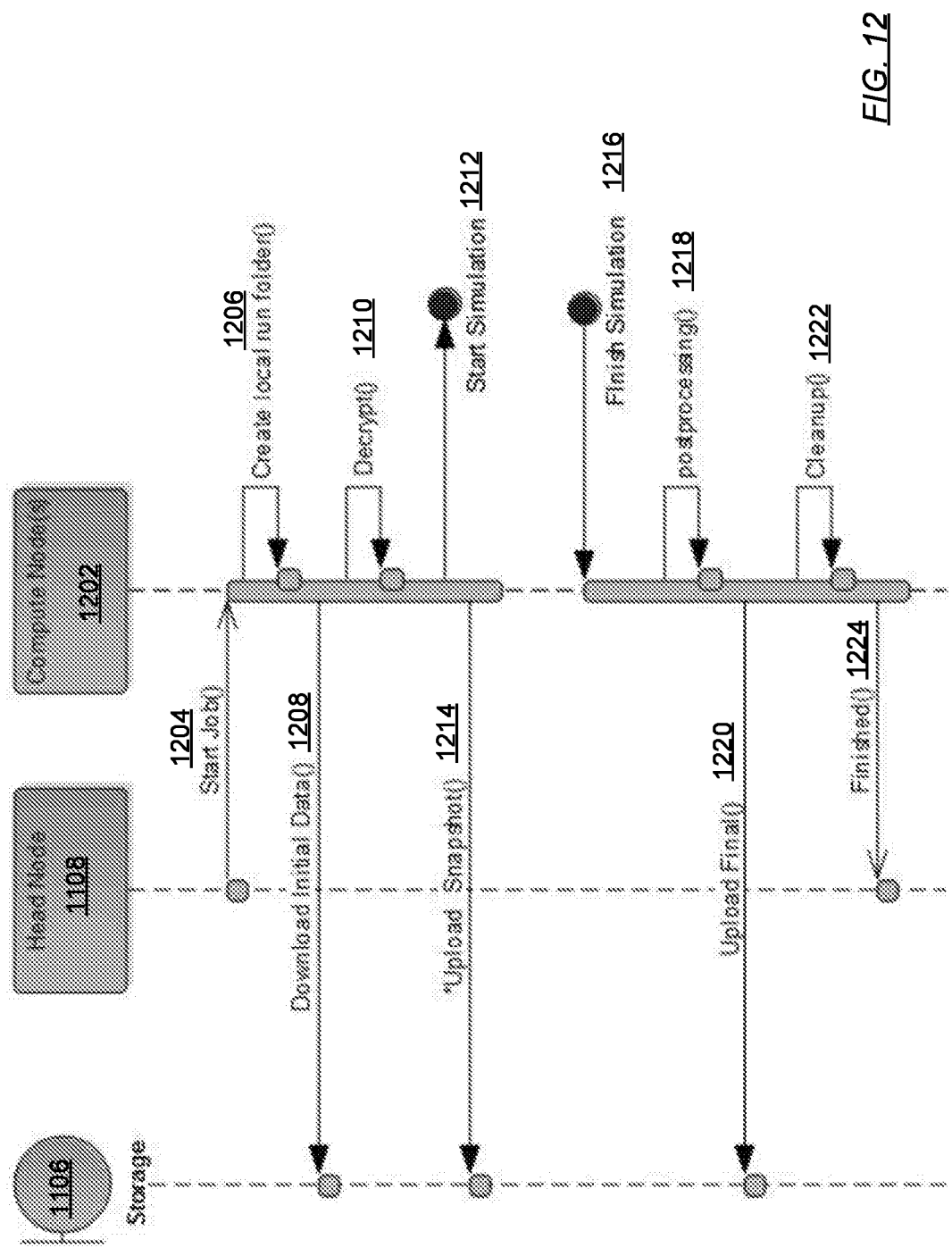

FIG. 12 shows an example timing diagram in accordance with one or more embodiments. In particular, FIG. 12 shows an example diagram for executing a job. After an HPC job is submitted, the job may remain queued, in a "Pending" state, until resources are available to run the job. For user computing system, a constraint may be the availability of compute nodes (1202) to execute the fracture simulator. When sufficient resources are available, the scheduler will dispatch the HPC job to start running (1204) on one or more compute nodes, which create a local run folder (1206). The HPC job includes several tasks or operations in addition to the core task of running a simulator. The tasks include downloading (1208), decrypting (1210), post-processing, encrypting and uploading the contents of the simulation run folder. Other tasks may be added to facilitate testing and diagnostics. The primary compute node executes the tasks in the HPC job. If the simulation task uses more than one node (e.g., for multi-node MPI tasks), then additional compute nodes will participate in the global MPI communicator. The compute nodes share a simulation run folder on the primary compute node. While the simulation runs (1212), a background task on the primary compute node will post periodic snapshots (1214) of the simulation results to the job container. When the simulation finishes (1216), the primary compute node executes a post-processing task (1218) to convert the simulation results into HDF5 format. The final results are encrypted and uploaded (1220) to the job container. Finally the local job folder is deleted from the cluster during cleanup (1222), and the schedule at head node is notified the HPC job has finished (1224).

Figure 13:
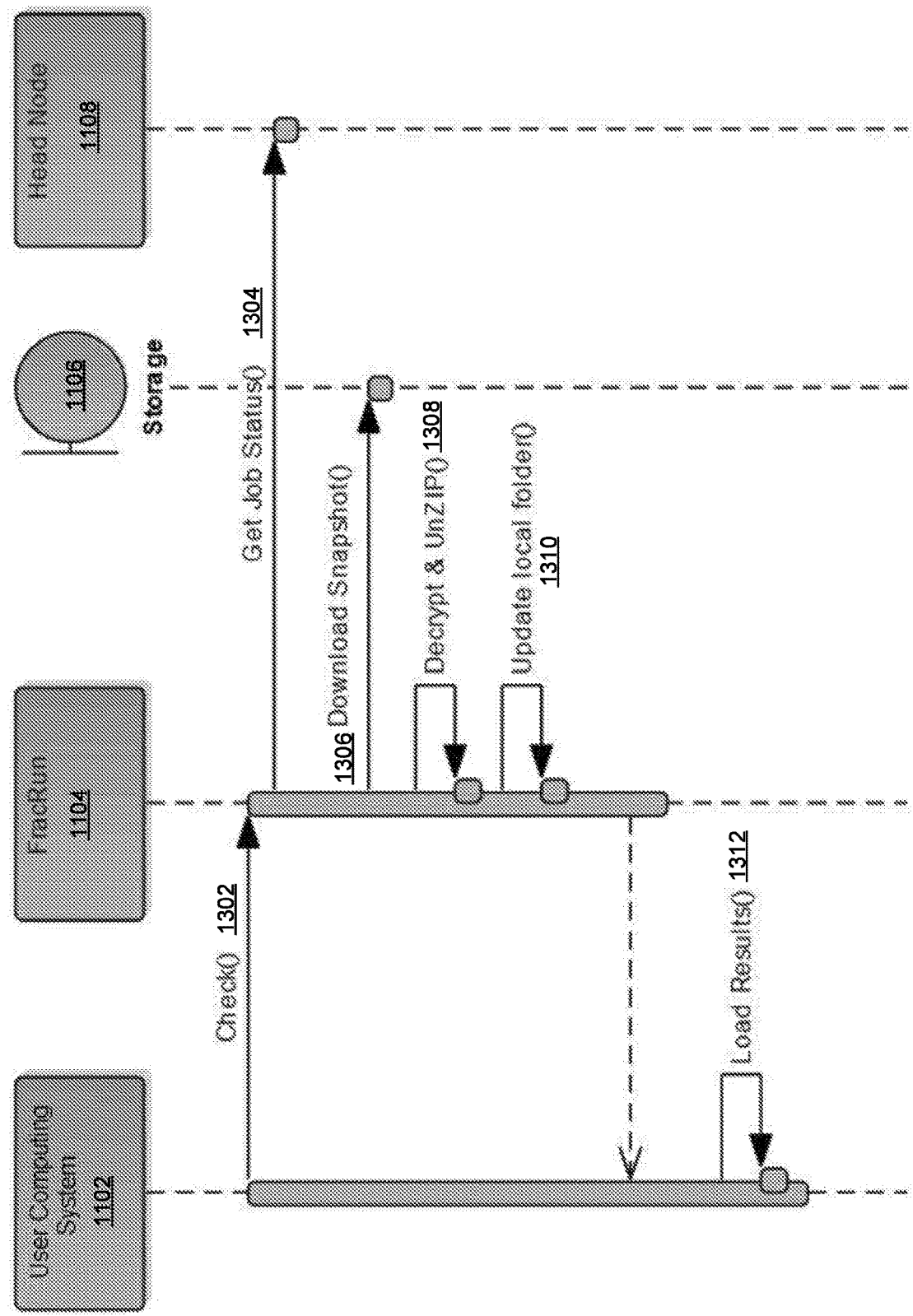

FIG. 13 shows an example timing diagram in accordance with one or more embodiments. In particular, FIG. 13 shows an example timing diagram for checking a job status in accordance with one or more embodiments. After an HPC job is submitted, the job may remain in a "Pending" state until resources are available to execute it. For user computing system, a constraint is the availability of compute nodes to execute the simulator. The user requests the user computing system to check the status of a job that has been submitted previously. User computing system invokes FracRun (1302) to check the job status. FracRun contacts the head node to check the job status (1304). FracRun lists the contents of the job container. If updated data is available, then FracRun downloads the latest data (1306), decrypts the data (1308) using the user certificate, and updates the local simulation run folder (1310). If the job is not runnable (e.g.: if the job is finished, cancelled, or failed) then FracRun deletes the job status file from the simulation run folder and records the job statistics. The user computing system may then load the results (1312).

FIGS. 14.1 and 14.2 show an example timing diagram in accordance with one or more embodiments. More particularly, FIGS. 14.1 and 14.2 show example timing diagrams for responding with intermediate results. The HPC jobs run asynchronously, independent of user computing system. While a job is executing, the user computing system user may check (1402) the status of the job (1404) and download intermediate results (1412). FracRun may manage the obtaining of the status, including downloading the snapshot, decryption (1408) of the snapshot, and uploading to a local folder (1410). The simulation results may be large, and the data transfer time may be several minutes or longer. As shown in FIG. 14.2, when the simulation finishes, the tasks described above in FIG. 12 may be performed.

One or more embodiments may exhibit the following. The automation may reduce repetition, improving the cycle time of the workflow setup (the user time that the user spends interacting with the machine, compute time not included) by an order of magnitude. Because the smaller tasks have been automated, the user may be able to focus on the hitherto inaccessible high-value workflow, carrying out sensitivity studies in a stochastic rather than deterministic space. Further, one or more embodiments may enable collaboration as computations are carried out remotely and results can be shared. User mobility may be enabled because the local machine is available for other tasks as computations are sent to the cloud. The combination of automation and elastic throughput afforded by the cloud enable answers in a small fraction of the time previously used (from month to day).

Further, one or more embodiments may allow, for a given range of control parameters, to determine the best completion strategy, best pumping schedule, best production scenario, best chemistry, best economic scenario, and combination thereof. The determination may be done stochastically rather than deterministically. Further, one or more embodiments have the orchestrator, a virtual gridder, virtualization of fracture simulators, virtualization of reservoir simulators, a sampling algorithm, a sharing of a zone model between multiple scenarios, and the orchestration of accurate stress shadowing calculations in the context of virtualized simulations.

The various computing systems or group of computing systems described above may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system in FIG. 3.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 3.1, while performing one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B includes comparing the first element of vector A with the first element of vector B, the second element of vector A with the second element of vector B, etc. In one or more embodiments, if A and B are strings, the binary values of the strings may be compared.

The computing system in FIG. 3.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 3.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present a few examples of functions performed by the computing system of FIG. 3.1 and the nodes and/or client device in FIG. 3.2. Other functions may be performed using one or more embodiments.

While the invention has been described with respect to a limited number of embodiments, those skilled in the art, having benefit of this disclosure, will appreciate that other embodiments can be devised which do not depart from the scope as disclosed herein.

What is claimed is:

1. A method comprising:
   receiving, from a user computing system, a simulation job request for simulating well management on a cloud computing system comprising a plurality of compute nodes;
   obtaining, for the simulation job request, a plurality of search spaces for a plurality of completion stage simulations, a plurality of fracture stage simulations, and a plurality of production stage simulations, wherein each search space includes ranges of values for a plurality of parameters relating to a respective stage simulation;
   orchestrating, using the plurality of search spaces, the plurality of completion stage simulations, the plurality of fracture stage simulations, and the plurality of production stage simulations on the cloud computing system to obtain at least one optional well plan, wherein the orchestrating the plurality of fracture stage simulations comprises:
  obtaining a plurality of ranges of geological uncertainty; sampling the plurality of search spaces and the plurality of ranges of geological uncertainty to create a plurality of experiments;
  distributing the plurality of experiments to the plurality of compute nodes in the cloud computing system via a head compute node to obtain a plurality of fracture simulation results from the plurality of compute nodes, wherein the plurality of experiments are distributed based at least in part on information included in distribution requests to the plurality of compute nodes and based at least in part on availability of compute resources in the plurality of compute nodes in the cloud computing system to ensure that the plurality of fracture stage simulations are performed concurrently;
  receiving the plurality of fracture simulation results from the plurality of compute nodes in the cloud computing system;
  performing an economic analysis on each fracture simulation result in the plurality of fracture simulation results to obtain a profitability indicator for each fracture simulation result; and
  aggregating the profitability indicators for the plurality of fracture simulation results to obtain the at least one optional well plan;
sending the at least one optional well plan to the user computer system; and
implementing the at least one optional well plan utilizing wellsite equipment at a wellsite including a wellbore defined by a subterranean formation, wherein implementing the at least one optional well plan includes performing at least one of a completion operation, a fracturing operation, and a production operation in the wellbore by manipulating the wellsite equipment based on the at least one optional well plan.

2. The method of claim 1, wherein the orchestrating the plurality of completion stage simulations comprises:
  obtaining, from the plurality of search spaces, a plurality of completion search spaces;
  sampling the plurality of completion search spaces and the plurality of ranges of geological uncertainty to create a plurality of completion experiments; and
  distributing the plurality of completion experiments to the plurality of compute nodes in the cloud computing system to obtain a plurality of completion simulation results.

3. The method of claim 2, wherein the orchestrating the plurality of completion stage simulations further comprises:
  performing an economic analysis on each completion simulation result in the plurality of completion simulation results to obtain a profitability indicator for each completion simulation result; and
  aggregating, using the profitability indicator for each completion simulation result, the plurality of completion simulation results to obtain a selected completion strategy.

4. The method of claim 3, wherein the orchestrating the plurality of fracture stage simulations further comprises:
  obtaining, from the plurality of search spaces, a plurality of fracture search spaces for the selected completion strategy;
  sampling the plurality of fracture search spaces to create a plurality of fracture experiments; and
  distributing the plurality of fracture experiments to the plurality of compute nodes in the cloud computing system to obtain the plurality of fracture simulation results.

5. The method of claim 4, wherein the orchestrating the plurality of fracture stage simulations further comprises:
  aggregating, using the profitability indicator for each fracture simulation result, the plurality of fracture simulation results to obtain a selected fracture strategy; and
  obtaining a selected fracture network corresponding to the selected fracture strategy.

6. The method of claim 5, wherein the orchestrating the plurality of production stage simulations comprises:
  obtaining, from the plurality of search spaces, a plurality of production search spaces for the selected fracture network;
  sampling the plurality of production search spaces to create a plurality of production experiments; and
  distributing the plurality of production experiments to the plurality of compute nodes in the cloud computing system to obtain a plurality of production simulation results.

7. The method of claim 6, wherein the orchestrating the plurality of production stage simulations further comprises:
  performing an economic analysis on each production simulation result in the plurality of production simulation results to obtain a profitability indicator for each production simulation result; and
  aggregating, using the profitability indicator for each production simulation result, the plurality of production simulation results to obtain the at least one optional well plan.

8. A system comprising:
  a data repository for storing:
    a simulation run folder comprising a plurality of search spaces, wherein each search space includes ranges of values for a plurality of parameters relating to a respective stage simulation, and a job container comprising a simulation job request,
    wherein the data repository is configured to receive the simulation job request and the plurality of search spaces from a user computing system, and
    wherein the simulation job request is for simulating well management on a cloud computing system comprising a plurality of compute nodes;
  an orchestrator computing system configured to:
    obtain, from the data repository, the simulation job request,
    obtain, for the simulation job request and from the data repository, the plurality of search spaces for a plurality of completion stage simulations, a plurality of fracture stage simulations, and a plurality of production stage simulations,
    orchestrate, using the plurality of search spaces, the plurality of completion stage simulations, the plurality of fracture stage simulations, and the plurality of production stage simulations on the cloud computing system to obtain at least one selected optional well plan, wherein the orchestrating the plurality of fracture stage simulations comprises:

obtaining a plurality of ranges of geological uncertainty;

sampling the plurality of search spaces and the plurality of ranges of geological uncertainty to create a plurality of experiments;

distributing the plurality of experiments to the plurality of compute nodes in the cloud computing system via a head compute node to obtain a plurality of fracture simulation results from the plurality of compute nodes, wherein the plurality of experiments are distributed based at least in part on information included in distribution requests to the plurality of compute nodes and based at least in part on availability of compute resources in the plurality of compute nodes in the cloud computing system to ensure that the plurality of fracture stage simulations are performed concurrently;

receiving the plurality of fracture simulation results from the plurality of compute nodes in the cloud computing system;

performing an economic analysis on each fracture simulation result in the plurality of fracture simulation results to obtain a profitability indicator for each fracture simulation result; and aggregating the profitability indicators for the plurality of fracture simulation results to obtain the at least one selected optional well plan;

send the at least one selected optional well plan to the user computer system; and a wellsite system including at least one of completion equipment, fracturing equipment, and production equipment, wherein the at least one of completion equipment, fracturing equipment, and production equipment is positionable in a wellbore defined by a subterranean formation and operably connected to the user computer system and configured to be manipulated in the wellbore based on the at least one selected optional well plan.

9. The system of claim 8, wherein the orchestrating the plurality of completion stage simulations comprises:
obtaining, from the plurality of search spaces, a plurality of completion search spaces;
sampling the plurality of completion search spaces and the plurality of ranges of geological uncertainty to create a plurality of completion experiments; and
distributing the plurality of completion experiments to the plurality of compute nodes in the cloud computing system to obtain a plurality of completion simulation results.

10. The system of claim 9, wherein the orchestrating the plurality of completion stage simulations further comprises:
performing an economic analysis on each completion simulation result in the plurality of completion simulation results to obtain a profitability indicator for each completion simulation result; and
aggregating, using the profitability indicator for each completion simulation result, the plurality of completion simulation results to obtain a selected completion strategy.

11. The system of claim 10, wherein the orchestrating the plurality of fracture stage simulations further comprises:
obtaining, from the plurality of search spaces, a plurality of fracture search spaces for the selected completion strategy;
sampling the plurality of fracture search spaces to create a plurality of fracture experiments; and
distributing the plurality of fracture experiments to the plurality of compute nodes in the cloud computing system to obtain the plurality of fracture simulation results.

12. The system of claim 11, wherein the orchestrating the plurality of fracture stage simulations further comprises:
aggregating, using the profitability indicator for each fracture simulation result, the plurality of fracture simulation results to obtain a selected fracture strategy; and
obtaining a selected fracture network corresponding to the selected fracture strategy.

13. The system of claim 12, wherein the orchestrating the plurality of production stage simulations comprises:
obtaining, from the plurality of search spaces, a plurality of production search spaces for the selected fracture network;
sampling the plurality of production search spaces to create a plurality of production experiments; and
distributing the plurality of production experiments to the plurality of compute nodes in the cloud computing system to obtain a plurality of production simulation results.

14. The system of claim 13, wherein the orchestrating the plurality of production stage simulations further comprises:
performing an economic analysis on each production simulation result in the plurality of production simulation results to obtain a profitability indicator for each production simulation result; and
aggregating, using the profitability indicator for each production simulation result, the plurality of production simulation results to obtain the at least one selected optional well plan.

15. A non-transitory computer readable medium comprising computer readable program code for:
receiving, from a user computing system, a simulation job request for simulating well management on a cloud computing system comprising a plurality of compute nodes;
obtaining, for the simulation job request, a plurality of search spaces for a plurality of completion stage simulations, a plurality of fracture stage simulations, and a plurality of production stage simulations, wherein each search space includes ranges of values for a plurality of parameters relating to a respective stage simulation;
orchestrating, using the plurality of search spaces, the plurality of completion stage simulations, the plurality of fracture stage simulations, and the plurality of production stage simulations on the cloud computing system to obtain at least one selected optional well plan, wherein the orchestrating the plurality of fracture stage simulations comprises:
obtaining a plurality of ranges of geological uncertainty;
sampling the plurality of search spaces and the plurality of ranges of geological uncertainty to create a plurality of experiments;
distributing the plurality of experiments to the plurality of compute nodes in the cloud computing system via a head compute node to obtain a plurality of fracture simulation results from the plurality of compute nodes, wherein the plurality of experiments are distributed based at least in part on information included in distribution requests to the plurality of compute nodes and based at least in part on availability of compute resources in the plurality of compute nodes in the cloud computing system to ensure that the plurality of fracture stage simulations are performed concurrently;

receiving the plurality of fracture simulation results from the plurality of compute nodes in the cloud computing system;

performing an economic analysis on each fracture simulation result in the plurality of fracture simulation results to obtain a profitability indicator for each fracture simulation result; and aggregating the profitability indicators for the plurality of fracture simulation results to obtain the at least one selected optional well plan; and sending the at least one selected optional well plan to the user computer system, wherein the user computer system is operably connected to at least one of completion equipment, fracturing equipment, and production equipment positionable in a wellbore defined by a subterranean formation and configured to be manipulated in the wellbore by the user computer system based on the at least one selected optional well plan.

16. The non-transitory computer readable medium of claim 15, wherein the orchestrating the plurality of completion stage simulations comprises:

obtaining, from the plurality of search spaces, a plurality of completion search spaces;

sampling the plurality of completion search spaces and the plurality of ranges of geological uncertainty to create a plurality of completion experiments; and distributing the plurality of completion experiments to the plurality of compute nodes in the cloud computing system to obtain a plurality of completion simulation results.

17. The non-transitory computer readable medium of claim 15, wherein the orchestrating the plurality of fracture stage simulations comprises:

obtaining, from the plurality of search spaces, a plurality of fracture search spaces for a selected completion strategy;

sampling the plurality of fracture search spaces to create a plurality of fracture experiments; and distributing the plurality of fracture experiments to the plurality of compute nodes in the cloud computing system to obtain the plurality of fracture simulation results.

18. The non-transitory computer readable medium of claim 15, wherein the orchestrating the plurality of production stage simulations comprises:

obtaining, from the plurality of search spaces, a plurality of production search spaces for a selected fracture network;

sampling the plurality of production search spaces to create a plurality of production experiments; and distributing the plurality of production experiments to the plurality of compute nodes in the cloud computing system to obtain a plurality of production simulation results.

\* \* \* \* \*